US009580093B2

(12) United States Patent
DeSanzo et al.

(10) Patent No.: US 9,580,093 B2
(45) Date of Patent: *Feb. 28, 2017

(54) DATA COMMUNICATION SYSTEM AND METHOD FOR COMMUNICATING DATA IN A VEHICLE

(71) Applicant: General Electric Company, Schenectady, NY (US)

(72) Inventors: David Joseph DeSanzo, Erie, PA (US); David Schroeck, Erie, PA (US); Todd Goodermuth, Melbourne, FL (US); Veni Mudiam, Erie, PA (US); Matthew Joseph, Erie, PA (US); Sethu Madhavan, Erie, PA (US); Enrique David Torres, Erie, PA (US); Patricia Lacy, Erie, PA (US); Jason Dean, Erie, PA (US); Darren Gladney, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,932

(22) Filed: May 16, 2016

(65) Prior Publication Data

US 2016/0257326 A1 Sep. 8, 2016

Related U.S. Application Data

(63) Continuation of application No. 14/612,593, filed on Feb. 3, 2015, now Pat. No. 9,440,666, which is a (Continued)

(51) Int. Cl.
*B61L 27/04* (2006.01)
*B61L 27/00* (2006.01)
(Continued)

(52) U.S. Cl.
CPC ............. *B61L 27/00* (2013.01); *B61K 9/00* (2013.01); *B61L 27/04* (2013.01); *G01C 21/00* (2013.01);
(Continued)

(58) Field of Classification Search
CPC .... B61L 27/00; B61L 2205/04; B61L 25/025; B61L 27/04; B61L 2201/00;
(Continued)

(56) References Cited

U.S. PATENT DOCUMENTS

2004/0133319 A1    7/2004  Pillar et al.
2007/0137514 A1*   6/2007  Kumar .................... B61L 3/006
                                                        105/26.05

* cited by examiner

*Primary Examiner* — Yuen Wong
(74) *Attorney, Agent, or Firm* — John A. Kramer; Global Patent Operation

(57) ABSTRACT

A system includes an energy management system configured to be communicatively coupled with a communication system of a vehicle that travels on a trip along a route. The energy management system is configured to be removably coupled with the communication system such that the energy management system is mechanically disengageable from the communication system. The energy management system is further configured to receive data parameters from the communication system and to generate at least one of a trip plan or a control message for the vehicle based on the data parameters. The trip plan and/or the control message dictates tractive and braking efforts of the vehicle during the trip. The energy management system is configured to communicate the trip plan and/or the control message to the communication system for the communication system to implement for controlling movement of the vehicle during the trip.

19 Claims, 5 Drawing Sheets

Related U.S. Application Data continuation-in-part of application No. 14/101,673, filed on Dec. 10, 2013, now Pat. No. 8,972,143, which is a continuation of application No. 13/311,306, filed on Dec. 5, 2011, now Pat. No. 8,620,552.

(60) Provisional application No. 61/496,353, filed on Jun. 13, 2011.

(51) Int. Cl.
| | | |
|---|---|---|
| *G01C 21/00* | (2006.01) | |
| *G08G 9/00* | (2006.01) | |
| *H04L 29/08* | (2006.01) | |
| *G08G 1/133* | (2006.01) | |
| *B61K 9/00* | (2006.01) | |
| *B61L 25/02* | (2006.01) | |

(52) U.S. Cl.
CPC ............... *G08G 1/133* (2013.01); *G08G 9/00* (2013.01); *H04L 67/12* (2013.01); *B61L 25/025* (2013.01); *B61L 2201/00* (2013.01); *B61L 2205/04* (2013.01)

(58) Field of Classification Search
CPC .......... G01C 21/00; G08G 9/00; G08G 1/133; H04L 67/12; B61K 9/00
See application file for complete search history.

DATA COMMUNICATION SYSTEM AND METHOD FOR COMMUNICATING DATA IN A VEHICLE

CROSS-REFERENCE TO RELATED APPLICATIONS

This application is a continuation of U.S. application Ser. No. 14/612,593 ("the '593 Application"), filed Feb. 3, 2015. The '593 Application is a continuation-in-part of U.S. application Ser. No. 14/101,673 ("the '673 Application"), filed Dec. 10, 2013, now U.S. Pat. No. 8,972,143. The '673 Application is a continuation of U.S. application Ser. No. 13/311,306 ("the '306 Application"), filed Dec. 5, 2011, now U.S. Pat. No. 8,620,552. The '306 Application claims the benefit of U.S. Provisional Application Ser. No. 61/496,353 ("the '353 Application"), filed Jun. 13, 2011. The entire disclosures of these applications (the '593 Application, the '673 Application, the '306 Application, and the '353 Application) are incorporated by reference herein.

BACKGROUND

Certain vehicles (e.g., powered vehicles or vehicle consists) include communication systems that periodically obtain measurements related to the health, operations, or control of the vehicle. For example, locomotives in a rail vehicle consist ("consist" referring to a group of vehicles linked to travel together along a route, including possible coordinated control by one or more wired and/or wireless connections) may include communication systems that periodically receive measurements related to operations of the locomotive, such as speed, horsepower, temperature, brake pressure measurements, and the like. These measurements represent data parameters of the vehicle, and the values of the data parameters may periodically change. For example, measurements of speed of a traction motor may be a first data parameter, measurements of brake pressures may be a second data parameter, and so on.

The values of the data parameters may be requested and used by computerized services or applications running on the vehicle and/or running off-board the vehicle. These services or applications perform various functions based on the data parameters. For example, the services or applications may control tractive operations and/or braking operations of the vehicle, monitor performance of the vehicle over time, record events of the vehicle, and the like. The systems that acquire the data parameters and that are native to the vehicle, such as the systems that are initially installed in the vehicle, may use a communication protocol to form and communicate data messages that include the values of the data parameters. Other services or applications may use a different communication protocol that uses a different format to communicate and/or use the data messages that include the data parameters.

The different protocols used to communicate with the various systems, services, and applications can require different communication configurations to be used. For example, in order for a single device to communicate with systems, services, and/or applications using different communication protocols, the single device may need to have different communication configurations stored thereon. The communication configurations can dictate the rules and criteria used for communicating with the systems, services, and/or applications according to the different protocols.

In some known vehicles, in order to allow for communication between a device and the systems, services, and/or applications that use different protocols to communicate, the various communication configurations must be previously stored on-board the device and the device must be manually configured to communicate with the systems, services, and/or applications. If one or more systems, services, or applications are changed or swapped out, the configuration of the device may need to be manually re-configured to allow for communication between the device and a new system, service, or application that uses a different protocol.

A need exists for a system and method that allows for different systems, services, applications, and the like in a vehicle and using different communication protocols to communicate with a device without requiring the manual re-configuration of the device each time a system, service, application, and the like, using a different communication protocol, is added to the vehicle.

BRIEF DESCRIPTION

In one embodiment, a system includes an energy management system that has one or more processors. The energy management system is configured to be communicatively coupled with a communication system of a vehicle that travels on a trip along a route. The energy management system is configured to receive data parameters related to at least one of the vehicle, the route, or the trip from the communication system. The energy management system is further configured to generate at least one of a trip plan or a control message for the vehicle based on the received data parameters. The at least one of the trip plan or the control message dictates tractive and braking efforts of the vehicle during the trip. The energy management system is configured to communicate the at least one of the trip plan or the control message to the communication system for the communication system to implement the at least one of the trip plan or the control message to control movement of the vehicle during the trip. The energy management system is configured to be removably coupled with the communication system such that the energy management system is mechanically disengageable from the communication system.

In another embodiment, a system includes an interface gateway device and an energy management system. The interface gateway device is on a communication system of a vehicle that travels on a trip along a route. The interface gateway device is configured to be communicatively coupled to a data acquisition module. The energy management system includes one or more processors. The energy management system is configured to be communicatively coupled to the interface gateway device. The energy management system is configured to be removably coupled with the interface gateway device such that the energy management system is mechanically disengageable from the interface gateway device. The interface gateway device is configured to receive data parameters related to at least one of the vehicle, the route, or the trip from the data acquisition module and to communicate the data parameters to the energy management system. The energy management system is configured to generate at least one of a trip plan or a control message for the vehicle based on the received data parameters and to communicate the at least one of the trip plan or the control message to the interface gateway device for the communication system to implement to control the vehicle during the trip.

In another embodiment, a method for controlling a vehicle during a trip along a route includes determining whether a communicative coupling to a communication system on the vehicle is established. If the communicative coupling to the communication system is established, the method includes identifying the communication system. The method also includes retrieving a communication configuration associated with the communication system that is identified. The method further includes receiving data parameters from the communication system. The data parameters are communicated according to the communication configuration. The method includes generating at least one of a trip plan or a control message that dictates at least one of tractive efforts or braking efforts of the vehicle during the trip. The at least one of the trip plan or the control message is generated based on the received data parameters and the capability configuration. The method also includes communicating the at least one of the trip plan or the control message to the communication system for the communication system to implement the at least one of the trip plan or the control message to control movement of the vehicle during the trip. The at least one of the trip plan or the control message is communicated according to the communication configuration.

In another embodiment, a data communication system for a vehicle includes an interface gateway device that is configured to be communicatively coupled with a data acquisition module and a client module. The interface gateway device is further configured to receive a value of a data parameter related to operation of the vehicle from the data acquisition module and to communicate the value to the client module for performing a function for the vehicle. The interface gateway device also is configured to determine when either of the data acquisition module or the client module is communicatively coupled with the interface gateway device and to implement respective communication configurations associated with the data acquisition module or the client module to receive the value of the data parameter from the data acquisition module or communicate the value of the data parameter to the client module.

In another embodiment, a data communication system for a vehicle is provided. The system includes an interface gateway device that is configured to be communicatively coupled with a data acquisition module and with a client module. The interface gateway device is further configured to receive a value of a data parameter related to operation of the vehicle from the data acquisition module and to communicate the value to the client module for performing a function for the vehicle. The interface gateway device also is configured, upon system initialization of the interface gateway device, to cycle through a plurality of communication protocols available to the interface gateway device, at each of a plurality of communication links of the interface gateway device, until the interface gateway device has determined that the data acquisition module and the client module are communicatively coupled with the interface gateway device and has identified first and second communication protocols of the plurality of communication protocols that enable the interface gateway device to communicate with the data acquisition module and the client module, respectively.

In another embodiment, a method for communicating data in a vehicle is provided. The method includes monitoring one or more input/output ports for a communication link with a device, determining an identity of the device that is communicatively coupled with the one or more input/output ports by the communication link, selecting a communication configuration associated with the device based on the identity of the device, and using the communication configuration to communicate with the device.

In another embodiment, a computer readable storage medium for a vehicle having a processor is provided. The computer readable storage medium includes one or more sets of instructions that direct the processor to monitor one or more input/output ports for a communication link with a device, determine an identity of the device that is communicatively coupled with the one or more input/output ports by the communication link, select a communication configuration associated with the device based on the identity of the device, and communicate with the device according to the communication configuration.

In another embodiment, a data communication system for a vehicle is provided. The system includes a data acquisition module, a client module, and an interface gateway module. The data acquisition module is configured to obtain a value of a data parameter related to operation of the vehicle. The client module is configured to use the value of the data parameter to perform a function for the vehicle. The interface gateway device is configured to be communicatively coupled with at least one of the data acquisition module or the client module by one or more communication links. The interface gateway device is further configured to communicate the value from the data acquisition module to the client module. The interface gateway device also is configured to determine when the at least one of the data acquisition module or the client module is communicatively coupled with the interface gateway device and to implement a communication configuration associated with the at least one of the data acquisition module or the client module to communicate the value of the data parameter to the at least one of the data acquisition module or the client module.

DETAILED DESCRIPTION

Figure 1:
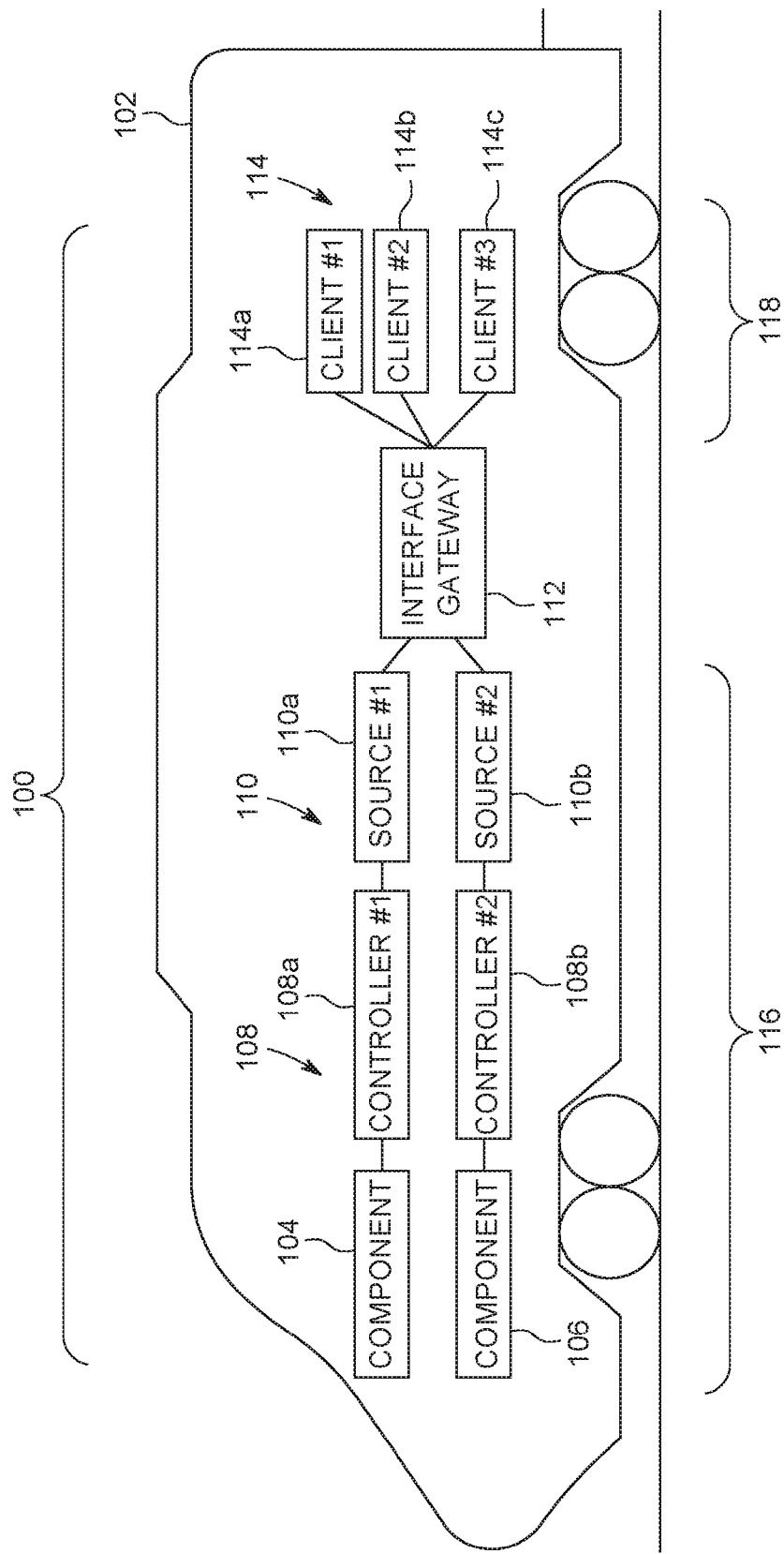
FIG. 1 is a schematic diagram of one embodiment of a vehicle data communication system disposed on-board a powered vehicle.

The foregoing brief description, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 is a schematic diagram of one embodiment of a vehicle data communication system 100 disposed on-board a powered vehicle 102. In the illustrated embodiment, the vehicle 102 is illustrated as a rail vehicle, such as a locomotive. Alternatively, the vehicle 102 may be another type of rail vehicle (such as a non-powered cargo car) or a non-rail vehicle, such as a different type of off-highway vehicle (OHV) or other vehicle. The system 100 is shown in FIG. 1 as being disposed entirely on-board the single vehicle 102. Alternatively, the system 100 may be distributed among several interconnected vehicles, such as by being partially disposed on each of several vehicles that include the vehicle 102 and that are mechanically coupled in a consist or other group.

The system 100 manages the acquisition and distribution of data related to operations of the vehicle 102 among devices disposed on-board and/or off-board the vehicle 102. The vehicle 102 includes one or more components 104 and/or subsystems 106 that perform various operations of the vehicle 102. While only one component 104 and one subsystem 106 are shown in the illustrated embodiment, the system 100 may include a greater number or none of one or more of the component 104 and/or subsystem 106. By way of example, the components 104 and/or subsystems 106 of the vehicle 102 may represent a propulsion subsystem that generates tractive effort for the vehicle 102 to propel itself (e.g., a subsystem that includes one or more traction motors), a braking subsystem that generates braking effort for the vehicle 102 to slow down or stop itself from moving, a wireless communication system that is used to communicate with another vehicle or system outside of the vehicle 102 (e.g., a radio transceiver with antenna), a sensor that obtains data related to the vehicle 102 (e.g., a brake air pressure sensor, a fuel gauge, a cargo sensor, a global positioning system (GPS) receiver, or the like), a user interface device that receives input from an operator of the vehicle 102 to control the vehicle 102, and the like. The previous list provides a non-limiting example of the types of components 104 and/or subsystems 106 that may be used. In one embodiment, any device, sensor, system, subsystem, memory, module, assembly, processor, or the like may be used as the component 104 and/or subsystem 106. One or more of the components 104 and/or subsystems 106 may be disposed off-board the vehicle 102, such as by being disposed on-board another vehicle that is mechanically coupled or interconnected with the vehicle 102 (e.g., a mechanically linked other vehicle in a rail vehicle consist).

The component 104 and subsystem 106 are operably coupled with controller devices 108 (e.g., "Controller #1" and "Controller #2"). As used herein, the term "operably coupled" includes two or more controllers, devices, sensors, systems, subsystems, assemblies, processors, memories, modules, or the like that are connected by one or more wired and/or wireless communication links, such as cables, busses, other conductive pathways (e.g., copper wires), wireless networks, fiber optic cables, and the like, such as to enable communication of data therebetween. The controller devices 108 are generally referred to by the reference number 108 and individually referred to by the reference numbers 108a and 108b. While two controller devices 108 are shown, alternatively, a smaller or larger number of controller devices 108 may be provided.

The controller devices 108 interface with the components 104 and/or subsystems 106 to obtain values of one or more data parameters from the components 104 and/or subsystems 106. The controller devices 108 may include one or more electronic devices that obtain values of one or more of the data parameters from the components 104 and/or subsystems 106. In one embodiment, one or more of the controller devices 108 may direct operations of the components 104 and/or subsystems 106. The controller devices 108 can include sensors that obtain one or more of the data parameters from the components 104 and/or subsystems 106, processors or other logic-based devices, along with associated circuitry, that monitor and/or control the components 104 and/or subsystems 106, and the like.

The data parameters obtained by the controller devices 108 represent data values related to operations of the vehicle 102. As used herein, the term "operations" can refer to performance of the vehicle 102 (e.g., related to actions and events performed in propelling goods and/or passengers), control of the vehicle 102 (e.g., throttle and/or brake settings), and/or health conditions of the vehicle 102 (e.g., a status of the vehicle 102 such as whether maintenance is required for the vehicle 102 or one or more components 104 and/or subsystems 106 are malfunctioning).

For example, if the subsystem 106 includes a propulsion subsystem that includes one or more traction motors and/or a sensor operably coupled with the propulsion subsystem, the controller device 108b may obtain measurements of horsepower generated by the traction motors, measurements of wheel slippage of the wheels connected to the traction motors, temperatures measurements of bearings, wheels, and/or axles interconnected with the traction motors, and the like. If the subsystem 106 includes a braking subsystem that includes air brakes and/or regenerative brakes, the controller device 108b may obtain measurements of air pressure in the air brakes and/or reservoirs connected to the air brakes, measurements of current obtained from the regenerative brakes, settings of the air brakes and/or regenerative brakes, and the like. If the component 104 includes an antenna that is used to communicate with another vehicle or system outside of the vehicle 102, then the controller device 108a can obtain data parameters representative of which communication channels are being used, quality of service (QoS) measurements of communication over the antenna, and the like. If the component 104 includes a sensor, then the controller device 108a can obtain data parameters representative of quantities measured or sensed by the sensor. The above provides a non-exclusive set of data parameters that can be obtained by the controller devices 108. One or more other types of data parameters that relate to operations of the vehicle 102 may be obtained.

The controller devices 108 are operably coupled with data acquisition modules 110 (e.g., "Source #1" and "Source #2"). As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The modules shown in the attached figures may represent the hardware that operates based on software or hardwired instructions, the software that directs hardware to perform the operations, or a combination thereof.

The data acquisition modules 110 are generally referred to by the reference number 110 and individually referred to by the reference numbers 110a, 110b, and 110c. While two data acquisition modules 110 are shown, alternatively, a smaller or larger number of data acquisition modules 110 may be provided. The data acquisition modules 110 interface with the controller devices 108 to acquire the values of the data parameters obtained by the controller devices 108 from the components 104 and/or subsystems 106. While each of the data acquisition modules 110 is shown as only interfacing or communicating with a single controller device 108, alternatively, one or more of the data acquisition modules 110 may interface with a plurality of the controller devices 108.

In the system 100, the data acquisition modules 110 may be referred to as "sources" of the available data parameters as the data acquisition modules 110 acquire the data parameters from the controller devices 108 and produce the data parameters for consumption (e.g., use) by one or more other parts of the system 100, such as client modules 114 described below.

The data acquisition modules 110 are operably coupled with an interface gateway device 112 ("Interface Gateway") in the illustrated embodiment. The interface gateway device 112 manages and controls the distribution of the data parameters through the system 100, as described in more detail below. For example, the interface gateway device 112 may act as an information gateway between a back end portion 116 of the system 100 and a front end portion 118 of the system 100. The back end portion 116 of the system 100 can generate the data that is used by the front end portion 118 of the system 100 to perform one or more functions, as described below. For example, the back end portion 116 can obtain values of the data parameters that are communicated via the interface gateway device 112 to the client modules 114, which use the values to perform various functions.

The back end portion 116 acquires the values of the data parameters as data and conveys the data in electronic messages (e.g., signals) to the interface gateway device 112. The interface gateway device 112 can receive the data via the messages and communicate the data to the client modules 114.

The client modules 114 ("Client #1" "Client #2," and "Client #3") are operably coupled with the interface gateway device 112. The client modules 114 are generally referred to by the reference number 114 and individually referred to by the reference numbers 114a, 114b, 114c. While three client modules 114 are shown, alternatively, a smaller or larger number of client modules 114 may be provided. The client modules 114 perform functions based on, or by using, at least some of the data parameters. For example, the client modules 114 interface with the interface gateway device 112 to receive the values of the data parameters from the interface gateway device 112. The client modules 114 send requests for data parameters to the interface gateway device 112 and may wait for a response from the interface gateway device 112 that includes the values of the data parameters. The client modules 114 may include or alternatively may be referred to as subscriber modules, which are "listening" devices that obtains the values of the data parameters used by the module by joining an address or a group, such as by issuing a "join" request to the interface gateway device 112 that joins the module to a multicast IP address. The interface gateway device 112 may periodically multicast the values of the data parameters to the IP address and the modules that subscribe to the IP address can receive the values. As described above, the client modules 114 may receive the data representative of the values of the data parameters in a format that is different from the format used by the back end portion 116 due to the interface gateway device 112 converting the format of the data.

A variety of functions related to operations of the vehicle 102 may be performed by the client modules 114. By way of example, a client module 114 may provide a digital video recorder (e.g., a locomotive digital video recorder or LDVR provided by General Electric Company) that obtains video recordings based on the data parameters (e.g., the data parameters may indicate when and/or where to record video). As another example, a client module 114 may provide asset tracking services (e.g., asset tracking system or ATS provided by General Electric Company) that monitors locations of assets (e.g., non-powered units and/or cargo such as goods and/or passengers) being propelled or conveyed by the vehicle 102 based on the data parameters.

A client module 114 may provide control services that control operations of the vehicle 102 and/or one or more other vehicles coupled or interconnected with the vehicle 102. For example, a client module 114 may use the data parameters to control the tractive efforts (e.g., by controlling throttle settings) provided by a propulsion subsystem of the vehicle 102 and/or to control braking efforts (e.g., by controlling brake settings) provided by brakes of the vehicle 102. The client module 114 may be part of a positive train control (PTC) system or a distributed power (DP) system that controls the tractive efforts and/or braking efforts of the vehicle 102 and/or one or more other powered units and/or non-powered units of a consist based on the data parameters. Alternatively, one or more of the client modules 114 may provide an energy management application that controls tractive effort and/or braking effort of the vehicle 102 (and/or one or more other powered units or vehicles of a consist) based on the data parameters. For example, a client module 114 may control throttle settings and/or brake settings based on a variety of factors represented by the data parameters, such as the types (e.g., horsepower provided) of powered units in a consist, the weight of cargo carried by the consist, the grade and/or curvature of a track that the vehicle 102 travels along, a geographic location obtained by a GPS receiver, and the like, in order to reduce fuel consumption by the consist. One example of such an energy management application may be the Trip Optimizer™ system provided by General Electric Company.

Other examples of a function provided by the client modules 114 can include control of cab signaling of a rail vehicle, an event recorder that monitors and records events related to operation of the vehicle 102, a location recorder that determines a geographic location of the vehicle 102 based on GPS sensor data received by a GPS receiver as a data parameter, fuel monitoring, radio monitoring, a visual display of operations or conditions of one or more components 104 and/or subsystems 106 of the vehicle 102, and the like. The above examples are provided for illustration and are not intended to be limiting on all embodiments of the presently described subject matter.

In one embodiment, the interface gateway device 112 may use different communication configurations for communicating with different components 104, subsystems 106, and/or client modules 114. A communication configuration may specify the parameters and settings used to communicate data messages between two devices, such as between the interface gateway device 112 and one or more of the data acquisition modules 110 and/or client modules 114. For example, a communication configuration may specify a communication protocol to be used to communicate the data messages between the devices. A "communication protocol" includes a set of one or more formats and/or rules for exchanging messages between the devices. Different communication protocols may use different types of signaling mechanisms, authentication techniques, error detection mechanisms, message correction techniques, and the like. A communication protocol may define the format, semantics, and/or synchronization of messages between devices using the protocol. A format of a communication protocol can represent the syntax in which data is recorded, read, and/or communicated between the devices in messages. For example, the format of a communication protocol may be based on a syntax of the protocol, such as one or more rules that define how various combinations of symbols, alphanumeric text, binary bits (e.g., 0's and 1's), and the like, are combined and used to represent and communicate data between a transmitter and a recipient that are communicating using the protocol.

A communication configuration may specify a sequence of how messages are exchanged between devices. For example, a first communication configuration may involve a message "handshake" between the devices in order to communicate between the devices. A message handshake can include two-sided messaging, such as a first device sending a first message to a second device and the second device sending a second message, such as a response or confirmation of receipt of the first message, to the first device. A different, second communication configuration may not require a message handshake, and instead may permit or provide for one-sided messaging. One-sided messaging can include a first device sending a first message to a second device without a second message being sent back to the first device from the second device.

In one embodiment, a communication configuration can include a list or set of one or more data parameters that are to be communicated or published to a device. For example, one or more client modules 114 may be associated with a communication configuration that specifies a predetermined list or set of data parameters. The values of the data parameters in the list or set can be published or transmitted to the client modules 114 that use the communication configuration via the interface gateway device 112. Different communication configurations can include different lists or sets of data parameters that are to be published.

A communication configuration can include a list or set of one or more data parameters that are available for communication or publication to a device. For example, not all data parameters that are obtained by the controller devices 108 may be available to all client modules 114 due to reasons of incompatibility, security, and the like. The communication configuration for a client module 114 may specify a subset of the data parameters that are obtained by the controller devices 108. For example, if the controller devices 108 obtain a set of one hundred data parameters, the communication configuration for a client module 114 may only include a subset of ten of the data parameters. The set of data parameters that are obtained by the controller devices 108 may be referred to as the "available data parameters." The communication configuration can limit the publication or communication of data parameters to the client module 114 to the subset of the available data parameters defined by the communication configuration.

In one embodiment, a communication configuration may specify whether a log or record is to be kept of the activities of the interface gateway device 112 and/or the device communicating with the interface gateway device 112. For example, the communication configuration may list activities, such as the data parameters, communication errors, requests for data parameters, and the like, that are transmitted by a data acquisition module 110 or client module 114 to the interface gateway device 112 and/or transmitted from the interface gateway device 112 to a data acquisition module 110 or client module 114.

The communication configurations associated with different data acquisition modules 110, client modules 114, or other components or devices of the system 100 may be stored as configuration files on a computer readable storage medium, such as a hard disc, flash drive, RAM, ROM, CD, DVD, or other type of memory, that is accessible by the interface gateway device 112. As described below, the interface gateway device 112 can monitor which data acquisition modules 110, client modules 114, or other components or devices of the system 100 are communicatively coupled with the interface gateway device 112. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. When the interface gateway device 112 determines that a data acquisition module 110, client module 114, or other component or device is so coupled with the interface gateway device 112, the interface gateway device 112 may automatically load the corresponding communication configuration into the interface gateway device 112. By "load," it is meant that the interface gateway device 112 obtains the communication settings of the communication configuration and uses the settings to communicate with the data acquisition module 110, client module 114, or other component or device.

Figure 2:
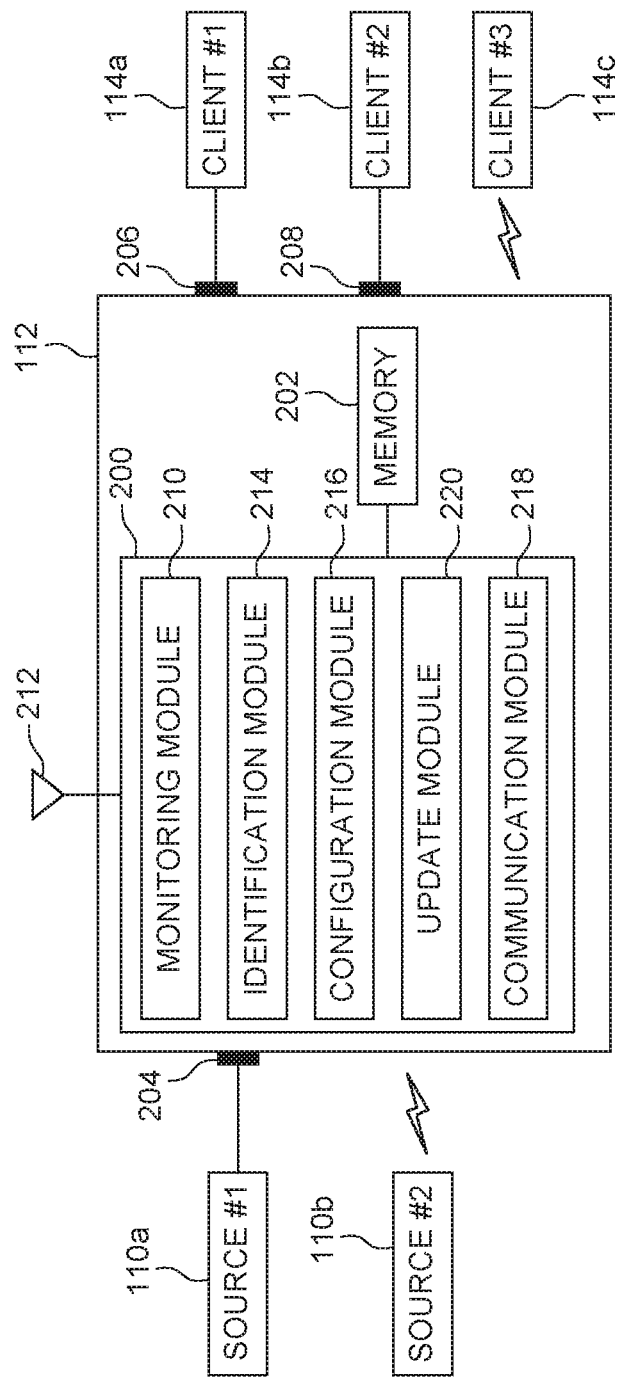
FIG. 2 is a schematic diagram of an interface gateway device shown in FIG. 1 in accordance with one embodiment.

FIG. 2 is a schematic diagram of the interface gateway device 112 in accordance with one embodiment. The interface gateway device 112 may include a hardware and/or software system that operates to perform one or more functions. In the illustrated embodiment, the interface gateway device 112 includes a processor 200 and a computer readable storage medium, or a memory 202, that perform various functions described herein. Alternatively, the interface gateway device 112 may include several modules that operate to cause the processor 200 to perform various functions described herein. For example, the interface gateway device 112 can be programmed or installed onto the memory 202 or into the processor 200 instead of including the processor 200 and/or memory 202. The processor 200 can include a microprocessor, controller, or equivalent control circuitry. The memory 202 can include a tangible and non-transitory computer readable storage medium, such as a physical device that stores data on a temporary or permanent basis for use by the processor 200. The memory 202 may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

The modules of the interface gateway device 112 include a monitoring module 210. The monitoring module 210 monitors one or more input/output ports of the interface gateway device 112 to determine when a device, such as a data acquisition module 110 or a client module 114, is communicatively coupled with the interface gateway device 112. For example, the data acquisition modules 110 and/or the client modules 114 may include electrical connectors 204, 206, 208 that mate with input/output ports 300, 302, 304 (shown in FIG. 3) of the interface gateway device 112 to communicatively couple the data acquisition modules 110 and the client modules 114 with the interface gateway device 112.

Figure 3:
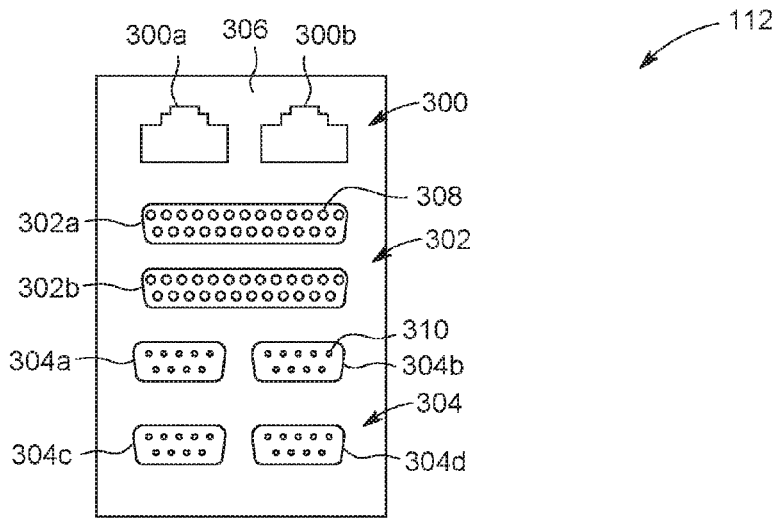
FIG. 3 is another schematic illustration of the interface gateway device shown in FIG. 1 in accordance with one embodiment.

With continued reference to FIG. 2, FIG. 3 is another schematic illustration of the interface gateway device 112 in accordance with one embodiment. The illustration of FIG. 3 may show a portion of an exterior housing 306 of the interface gateway device 112. The interface gateway device 112 includes the input/output ports 300, 302, 304 disposed on the housing 306. The ports 300, 302, 304 represent electrical connectors, such as electrical receptacles or plugs, that physically mate (e.g., receive or are inserted into) with the connectors 204, 206, 208 of the data acquisition modules 110 and the client modules 114 to communicate electronic messages therebetween.

In the illustrated embodiment, the ports 300 include Ethernet jacks 300a, 300b that are shaped to receive an Ethernet plug. For example, the ports 300 may receive one or more of the connectors 204, 206, 208 that is an Ethernet plug, such as an 8P8C plug, a 6P6C plug, a 6P4C plug, a 4P4C plug, and the like. Alternatively, one or more of the ports 300 may include an Ethernet plug and one or more of the connectors 204, 206, 208 may include an Ethernet jack. In another embodiment, connectors other than Ethernet jacks and plugs are used for the ports 300 and one or more of the connectors 204, 206, 208.

The ports 302 include serial receptacles 302a, 302b that are shaped to receive a serial connector plug in the illustrated embodiment. For example, the ports 302 may receive one or more of the connectors 204, 206, 208 that is serial plug, such as an RS 232 plug, an RS 422 plug, or the like. The ports 302 include conductive receptacles 308 that receive conductive pin of the serial plugs to conductively couple the ports 302 with one or more of the connectors 204, 206, 208. Alternatively, one or more of the ports 302 may include a serial plug and one or more of the connectors 204, 206, 208 may include a serial receptacle. In another embodiment, connectors other than serial receptacles and plugs are used for the ports 302 and one or more of the connectors 204, 206, 208. The ports 304 include serial plugs 304a, 304b, 304c, 304d that are shaped to be received in a serial receptacle. For example, the ports 304 may include an RS 232 plug, an RS 422 plug, or the like, having conductive pins 310 that are received in conductive receptacles (such as the conductive receptacles 308) in one or more of the connectors 204, 206, 208.

The number and/or type of input/output ports 300, 302, 304 shown in FIG. 3 are provided as examples. A greater or smaller number of the input/output ports 300, 302, and/or 304 may be provided. Additionally, one or more input/output ports other than the input/output ports 300, 302, and/or 304 may be included in the interface gateway device 112.

As shown in FIG. 2, in one embodiment, one or more of the input/output ports of the interface gateway device 112 that is used to communicate with one or more of the data acquisition modules 110 and/or the client modules 114 is a wireless communication channel. For example, instead of physically mating a connector with one or more of the input/output ports 300, 302, 304, one or more of the data acquisition modules 110 (such as the data acquisition module 110b) and/or the client modules 114 (such as the client module 114c) may communicate with the interface gateway device 112 through a wireless communication channel. A wireless communication channel may include one or more frequencies or range of frequencies over which the interface gateway device 112 may wirelessly communicate with the data acquisition device 110 and/or the client module 114. The interface gateway device 112 includes an antenna 212 that wirelessly communicates (e.g., transmits and/or receives) messages over one or more wireless communication channels with the data acquisition module 110 and/or the client module 114.

Returning to the discussion of the interface gateway device 112 shown in FIG. 2, the monitoring module 210 monitors one or more of the input/output ports of the interface gateway device 112 to determine when a device, such as a data acquisition module 110 or a client module 114, is communicatively coupled with the interface gateway device 112. With respect to the physical input/output ports 300, 302, 304 (e.g., the ports that include plugs inserted into receptacles, receptacles that receive plugs, fiber optic cables that are disposed close to or touching each other, or other connectors that mate with each other), the monitoring module 210 may determine when a conductive connection is made between conductors of a connector of a data acquisition module 110 or client module 114 and a connector of the interface gateway device 112. For example, the monitoring module 210 may determine when a conductive pin of a connector 204, 206, 208 is received in a conductive receptacle of an input/output port 300, 302, 304 in the interface gateway device 112, or when a conductive receptacle of the connector 204, 206, 208 receives a conductive pin of an input/output port 300, 302, 304. In one embodiment, the monitoring module 210 determines when a module is coupled with one or more input/output ports of the interface gateway device 112 by determining when an electric circuit is closed by the mating of a connector 204, 206, 208 and an input/output port 300, 302, 304.

With respect to wireless communication links, the monitoring module 210 can monitor one or more wireless communication channels to determine when a data acquisition module 110 and/or a client module 114 is communicatively coupled with the interface gateway device 112. For example, the monitoring module 210 may scan through a plurality of frequencies or wireless communication channels over the antenna 212 to determine which, if any, of the communication channels are being used to communicate data with the interface gateway device 112.

An identification module 214 determines which device is communicatively coupled with the interface gateway device 112. For example, once the monitoring module 210 determines that a data acquisition module 110 and/or a client module 114 is physically coupled or wirelessly coupled with an input/output port (physical port or wireless port/communication channel) of the interface gateway device 112, the identification module 214 may identify a type of data acquisition module 110 or client module 114 that is coupled with the interface gateway device 112. A "type" of data acquisition module 110 or client module 114 can include a category or group of data acquisition modules 110 or client modules 114 that use the same communication configurations described above. In one embodiment, a type of data acquisition module 110 or client module 114 can include a category or group of data acquisition modules 110 or client modules 114 that acquire one or more of the same data, communicate one or more of the same messages or use the same message formats, request one or more of the same data parameters, provide one or more of the same functions for the vehicle 102 (shown in FIG. 1), monitor one or more of the same operations of the vehicle 102, and the like.

In one embodiment, the identification module 214 may identify which data acquisition module 110 or client module 114 is communicatively coupled with an input/output port of the interface gateway device 112 by examining data communicated from the data acquisition module 110 or client module 114 to the interface gateway device 112 through the input/output port. For example, the data acquisition module 110 or client module 114 may transmit one or more messages that include identifying information to the interface gateway device 112 through the input/output port. The messages can include identifying information such as an address (e.g., IP address) or an alphanumeric bitstring that is unique to the data acquisition module 110, the client module 114, or a group or type of data acquisition modules 110 or client modules 114. For example, the messages communicated from the data acquisition module 110 or client module 114 may include header frames having identifying information of the module 110, 114 that transmitted the message.

In another embodiment, the input/output port 300, 302, 304 to which the data acquisition module 110 or client module 114 is mated and/or the connector 204, 206, 208 of the data acquisition module 110 or client module 114 may include keying features that permit a subset of the data acquisition modules 110 or client modules 114 to use the port 300, 302, 304. For example, and as shown in FIG. 3, the different ports 300, 302, 304 may have different shapes such that a subset of the connectors 204, 206, 208 are shaped to mate with the ports 300, 302, 304. The subset of the connectors 204, 206, 208 that can mate with the ports 300, 302, 304 may have complimentary shapes to the ports 300, 302, 304 while other connectors 204, 206, 208 do not have complimentary shapes. The complimentary shaped connectors 204, 206, 208 and ports 300, 302, 304 can mate with each other while non-complimentary shaped connectors 204, 206, 208 and ports 300, 302, 304 may not be able to mate with each other. In one embodiment, the keying features can include one or more protrusions, slots, receptacles, or other features that compliment each other such that some connectors 204, 206, 208 and ports 300, 302, 304 are able to mate with each other while other connectors 204, 206, 208 and ports 300, 302, 304 are unable to mate with each other. The identification module 214 can determine which data acquisition module 110 or client module 114 is mated which the port 300, 302, 304 when the data acquisition module 110 or client module 114 mates with the port 300, 302, 304. For example, if the keying features only permit one type of the data acquisition module 110 or client module 114 to mate with a particular port 300, 302, 304, then the identification module 214 can identify the data acquisition module 110 or client module 114 when the data acquisition module 110 or client module 114 mates with the port 300, 302, 304.

A configuration module 216 of the interface gateway device 112 determines the communication configurations for the data acquisition modules 110 and/or the client modules 114 that are communicatively coupled with the interface gateway device 112. In one embodiment, once the monitoring module 210 determines that the data acquisition module 110 or client module 114 is coupled with the interface gateway device 112 and the identification module 214 identifies which data acquisition module 110 or client module 114 is coupled with the interface gateway device 112, the configuration module 216 obtains the configuration settings for the corresponding data acquisition modules 110 and/or client modules 114. For example, the configuration module 216 may retrieve the settings for the communication configuration associated with the data acquisition modules 110 and client modules 114 from the memory 202.

As described above, the communication configuration associated with a data acquisition module 110 or client module 114 may specify the rules and/or procedures for communicating messages between the data acquisition module 110 or client module 114 and the interface gateway device 112. The configuration module 216 may load the communication configurations for the data acquisition module 110 or client module 114 by conveying the communication configuration settings to a communication module 218 described below.

An update module 220 can obtain the communication configurations for data acquisition modules 110 and/or client modules 114 that are not stored on the memory 202. For example, if the communication configuration for the data acquisition module 110 or client module 114 is not stored on the memory 202, the update module 220 may acquire the communication configuration for the data acquisition module 110 or client module 114. The update module 220 can acquire the communication configuration by querying an off-board device (e.g., a computer having a wireless transmitter or antenna) for the communication configuration. The off-board device may transmit the communication configuration to the update module 220 via the antenna 212. Alternatively, an on-board device (e.g., a computer device or other memory disposed on the vehicle 102 shown in FIG. 1) may provide the communication configuration to the update module 220. The update module 220 may store the communication configuration on the memory 202 and/or convey the communication configuration to the configuration module 216.

The communication module 218 receives the communication configuration from the memory 202, the configuration module 216, or the update module 216 and uses the communication configuration to control the communication of messages to and/or from the interface gateway device 112 with the data acquisition modules 110 and/or client modules 114 that are communicatively coupled with the interface gateway device 112. As described above, the communication configurations can specify the parameters and settings used by the communication module 218 to communicate data messages with the data acquisition modules 110 and/or client modules 114. The communication module 218 may concurrently use different communication configurations with different data acquisition modules 110 and/or client modules 114.

In another embodiment, upon application start (or commencement of operation of interface gateway device 112 (or similar device) starts all of its internal applications which correspond to every system and or subsystem with which the interface gateway device 112 is capable of communicating. For example, the interface gateway device 112 may begin internal algorithms, software applications, and the like, that permit or control communication between the interface gateway device 112 and every source 110 and/or client 114 with which the interface gateway device 112 is configured or is capable of communicating. The interface gateway device 112 attempts to establish communications via a handshaking process or other similar method using the input/output port 300, 302, 304. The interface gateway device 112 monitors the input/output port 300, 302, 304 in an order to determine if the correct response is received from the source 110 and/or client 114 connected to the input/output port 300, 302, 304. For example, during the handshaking process, the interface gateway device 112 may transmit one or more signals to a source 110 or client 114 through a corresponding input/output port 300, 302, 304. The source 110 or client 114 may then either respond with a designated confirmation response (e.g., confirming the handshake connection between the interface gateway device 112 and the source 110 or client 114), respond with a response that differs from the confirmation response (e.g., notifying that the handshake connection is not confirmed or established), or may not provide any response.

If the correct response (e.g., the designated confirmation response) is received from the source 110 or client 114, the interface gateway device 112 declares that communications with the source 110 or client 114 are established. The interface gateway device 112 adds that source 110 or client 114 to a list of connected devices that is maintained by the interface gateway device 112. If no response or an incorrect response is received (e.g., the confirmation response is not received or a different response is received), then the interface gateway device 112 may try to establish communication with another source 110 or client 114 on the same input/output port 300, 302, 304. The interface gateway device 112 may sequentially cycle through a list of sources 110 and/or clients 114 that may be connected to the input/output port 300, 302, 304 until the designated confirmation response is received or all sources 110 and/or clients 114 in the list have been attempted without receiving the designated confirmation response. Alternatively, the interface gateway device 112 may move on to the next input/output port 300, 302, 304 and repeat the process described above. Once the interface gateway device 112 establishes a list of all the connected sources 110 and/or clients 114 (or other devices), the interface gateway device 112 applies the appropriate internal configuration files. This permits the interface gateway device 112 to provide the functionality defined for that system and or subsystem.

Figure 4:
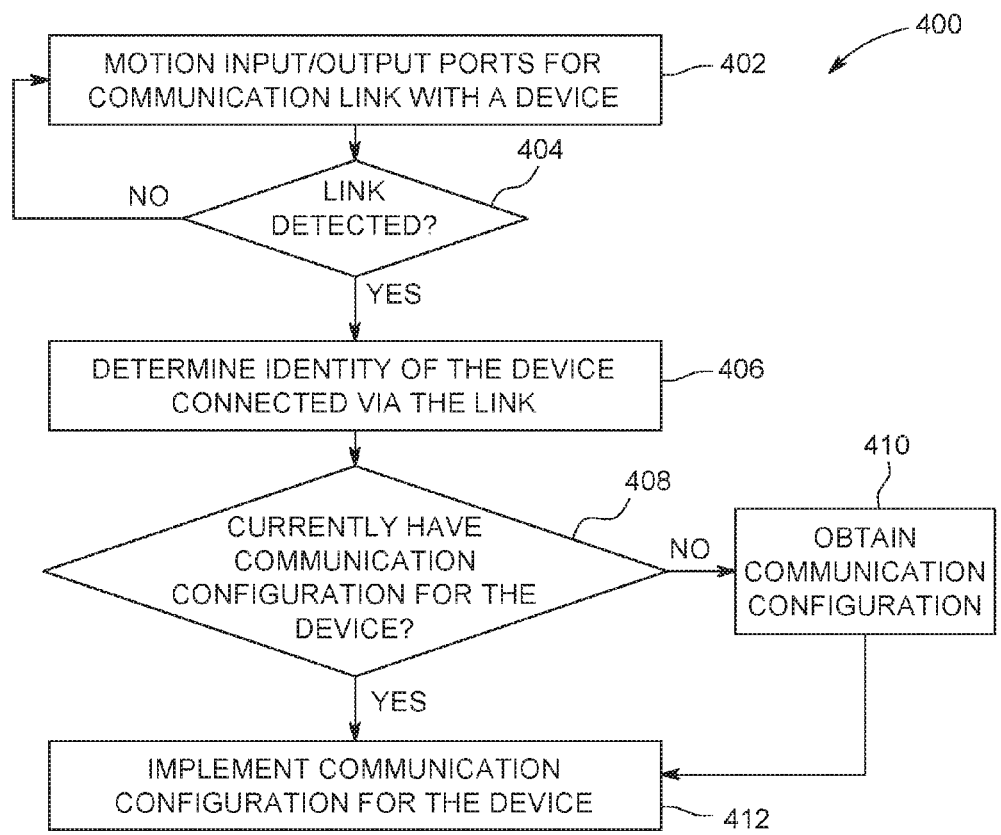
FIG. 4 is a flowchart of one embodiment of a method for communicating data in a vehicle.

FIG. 4 is a flowchart of one embodiment of a method 400 for communicating data in a vehicle. The method 400 may be used in conjunction with one or more embodiments of the system 100 (shown in FIG. 1) described above. For example, the method 400 may be used with a system in a vehicle that acquires values of data parameters and sends or publishes the values of the data parameters to one or more client modules to permit the client modules to perform one or more functions related to the vehicle.

At 402, one or more input/output ports are monitored to determine if a communication link is established. For example, the input/output ports 300, 302, 304 (shown in FIG. 3) and/or one or more wireless communication channels may be monitored to determine when a data acquisition module 110 (shown in FIG. 1) and/or a client module 114 (shown in FIG. 1) is physically mated to one or more of the ports 300, 302, 304 and/or is communicatively coupled with the interface gateway device 112 (shown in FIG. 1) via a wireless communication channel.

At 404, a determination is made as to whether a communication link is detected. For example, a determination may be made as to whether a connector 204, 206, 208 (shown in FIG. 2) of a data acquisition module 110 (shown in FIG. 1) and/or a client module 114 (shown in FIG. 1) is mated with an input/output port 300, 302, 304 (shown in FIG. 3) of the interface gateway device 112 (shown in FIG. 1). As another example, a determination may be made as to whether a data acquisition module 110 and/or a client module 114 is wirelessly transmitting data to the interface gateway device 112 via one or more communication channels. If a communication link is detected, flow of the method 400 may continue to 406. On the other hand, if no communication link is detected, flow of the method 400 may return to 402.

At 406, an identity of the device that is communicatively coupled via the communication link is determined. For example, the interface gateway device 112 (shown in FIG. 1) may determine which of the acquisition data modules 110 (shown in FIG. 1) and/or client modules 114 (shown in FIG. 1) is communicatively coupled with the interface gateway device 112. The identity of the acquisition data module 110 and/or client module 114 may be the identity of a group or type of acquisition data modules 110 and/or client modules 114, as described above.

At 408, a determination is made as to whether the communication configuration for the communicatively coupled device is available. For example, the interface gateway device 112 (shown in FIG. 1) may determine if a communication configuration file associated with the identified data acquisition module 110 (shown in FIG. 1) and/or client module 114 (shown in FIG. 1) is stored on the memory 202 (shown in FIG. 2) disposed on-board the vehicle 102 (shown in FIG. 1). If the communication configuration for the identified device is not available, then the communication configuration may need to be acquired in order to configure the communications with the identified device. As a result, flow of the method 400 may continue to 410. On the other hand, if the communication configuration for the identified device is available, then flow of the method 400 may proceed to 412.

At 410, the communication configuration for the identified device is obtained. For example, the interface gateway device 112 (shown in FIG. 1) may wirelessly download the communication configuration from a computer device disposed off-board the vehicle 102 (shown in FIG. 1) via the antenna 212 (shown in FIG. 2). Alternatively, the interface gateway device 112 may download the communication configuration from a computer device disposed on-board the vehicle 102.

At 412, the communication configuration for the identified device is implemented. For example, the settings, protocols, formats, and the like, that are used to communicate data messages with the identified device are used by the interface gateway device 112 (shown in FIG. 1) to communicate with the identified device. The interface gateway device 112 may use different communication configurations for different data acquisition modules 110 (shown in FIG. 1) and/or client modules 114 (shown in FIG. 1).

In one embodiment, a plurality of different communication configurations is stored in a common location, such as on the memory 202 (shown in FIG. 2). The interface gateway device 112 (shown in FIG. 1) may select and implement (e.g., put into use for communication) the communication configuration applicable to the identified data acquisition module 110 (shown in FIG. 1) or client module 114 (shown in FIG. 1).

Figure 5:
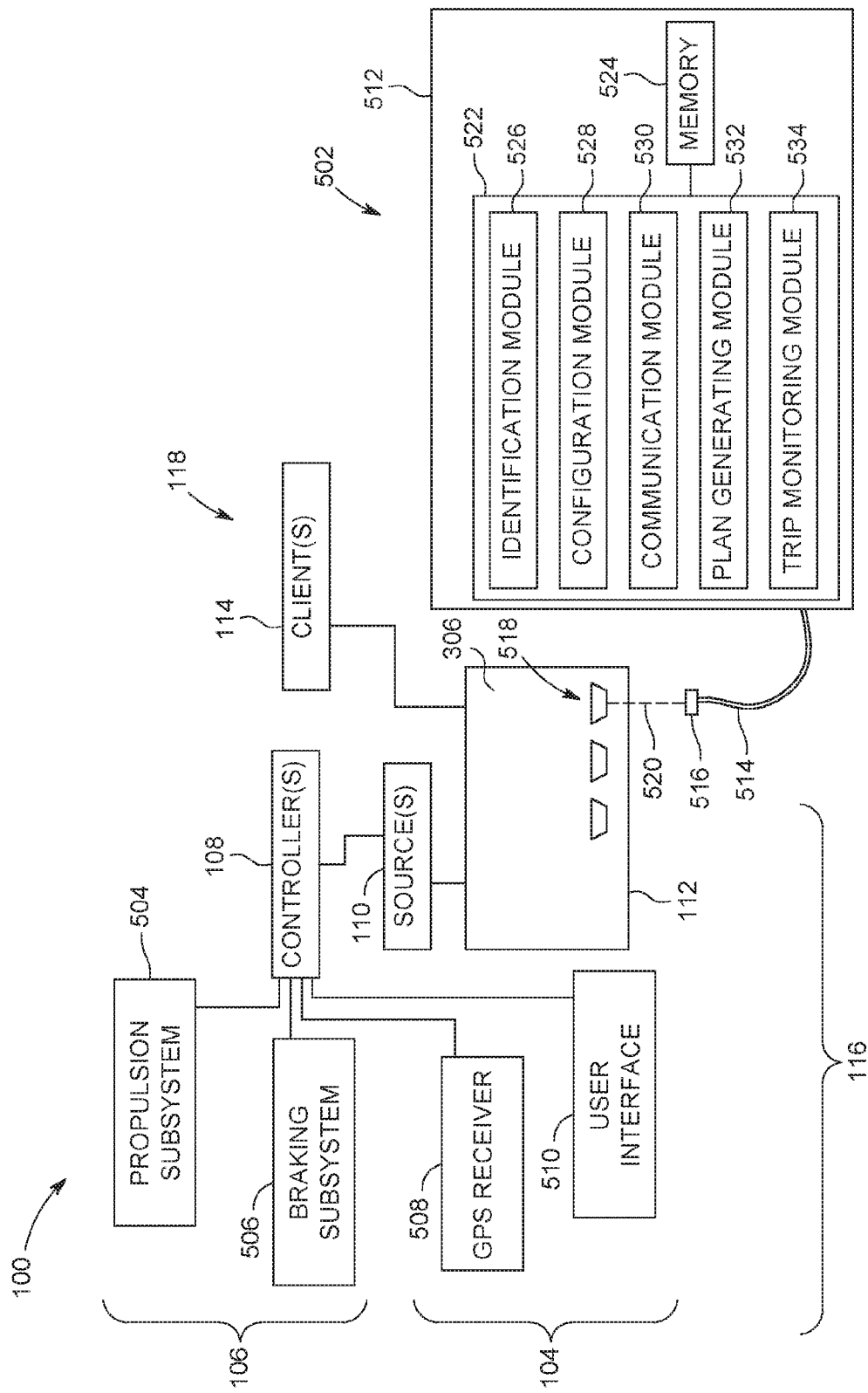
FIG. 5 is a schematic diagram of one embodiment of the vehicle data communication system including an energy management system.

FIG. 5 is a schematic diagram of one embodiment of the vehicle data communication system 100 and an energy management system 502. The vehicle data communication system 100 shown in FIG. 5 includes at least some of the same components or parts shown in FIG. 1. For example, the interface gateway device 112 in FIG. 5 is communicatively coupled to a back end portion 116 of the vehicle data communication system 100, which includes one or more data acquisition modules 110 (e.g., "Source(s)"), one or more controllers 108, and one or more components 104 and/or subsystems 106. In the illustrated embodiment, the subsystems 106 include the propulsion subsystem 504 and the braking subsystem 506, and the components 104 include the GPS receiver 508 and the user interface device 510, each of which is described above with reference to FIG. 1. The subsystems 504, 506 and the components 508, 510 illustrated in FIG. 5 may represent only a subset of the total number of subsystems 106 and/or components 104 in the vehicle data communication system 100.

In an embodiment, the energy management system 502 is separate from the vehicle data communication system 100, but is configured to communicate with the system 100. For example, the energy management system 502 may be separate from, but communicatively coupled to, the communication system 100 via a conductive connection or a wireless connection. In an alternative embodiment, the energy management system 502 is part of the system 100 and represents one of the client modules 114 that define the front end portion 118 of the system 100. For example, the energy management system 502 may be one of the client modules 114 that communicates in the system 100 when the energy management system 502 is communicatively coupled to the interface gateway device 112, or another device in the system 100.

The energy management system 502 is configured to perform functions based on, or by using, at least some of the data parameters acquired by the data acquisition modules 110 on the back end portion 116 of the system 100. At least one of the functions of the energy management system 502 may be to provide control services that control operations of the vehicle 102 (shown in FIG. 1) and/or one or more other vehicles coupled to or interconnected with the vehicle 102 based on the received data parameters. The energy management system 502 may use the data parameters to control the tractive efforts (e.g., by controlling throttle settings) provided by the propulsion subsystem 504 of the vehicle 102 and/or to control braking efforts (e.g., by controlling brake settings) provided by braking subsystem 506 of the vehicle 102. The energy management system 502 may control throttle and brake settings by generating control messages or signals that are transmitted to the respective propulsion and braking subsystems 504, 506, or to the controllers 108 that control the subsystems 504, 506. Optionally, the energy management system 502 may generate control messages for controlling other subsystems 106, components 104, and/or client modules 114 on the vehicle, such as a user interface device 510, lights, speakers and/or horns, and the like. Some control messages or signals may be transmitted to components and/or subsystems on other vehicles interconnected to the vehicle 102 within the same consist, in a positive train control (PTC) system, or in a distributed power (DP) system. The control messages may be based on information related to the vehicle 102, the vehicle consist, and/or a trip of the vehicle 102.

The energy management system 502 provides control services that control operations of the vehicle 102 (shown in FIG. 1) and/or a vehicle consist that includes the vehicle based on a variety of factors represented by the data parameters in order achieve one or more designated goals during a trip of the vehicle 102 while meeting or adhering to set constraints. One typical goal of the energy management system 502 is to reduce the amount of fuel or other energy source consumed during the trip. Other designated goals that may be taken into account by the energy management system 502 include reducing travel time, reducing wear on the vehicle 102 and other interconnected vehicles, reaching a destination at a predefined time, increasing throughput of vehicle systems on a vehicle network, reducing emissions, reducing noise, and the like. The set constraints may include speed limits, other regulatory restrictions (such as noise, emissions, etc.), and the like. One example of the energy management system 502 is the Trip Optimizer™ system provided by General Electric Company.

The energy management system 502 may not be an integral component of the vehicle 102 and/or the vehicle data communication system 100. In an embodiment, the energy management system 502 is removable relative to the vehicle data communication system 100 and/or the vehicle 102. For example, the energy management system 502 is mechanically disengageable from the communication system 100 and/or the vehicle 102. When the energy management system 502 is mechanically disengaged from the communication system 100, the energy management system 502 is not communicatively coupled to the communication system 100 such that no communications are successfully transmitted between the systems 100, 502. Thus, to establish a communicative coupling between the systems 100, 502, the energy management system 502 may need to be mechanically engaged to the interface gateway device 112 or another device in the communication system 100, such that an electrical conductive path (e.g., via electrical contacts, circuits, conductive wires, and the like) or an electrical inductive path (e.g., via inductors, coils, transformers, and the like) is formed to provide a communication link between the systems 100, 502. When the energy management system 502 is mechanically engaged with the communication system 100, the systems 502, 100 are communicatively coupled and may communicate messages therebetween via conductive and/or inductive paths. In one or more embodiments, the energy management system 502 may be an add-on device or application that is connected to or installed in the vehicle 102 after the vehicle 102 is assembled, offered for sale, or sold. The energy management system 502 may be removable from the vehicle 102, such as by disconnecting the device or deleting the application.

In FIG. 5, the energy management system 502 is a removable, discrete device that includes a housing 512 and a cable 514 extending from the housing 512. The cable 514 is used to communicatively couple the energy management system 502 to the system 100 (e.g., to the interface gateway device 112 in the illustrated embodiment). The cable 514 provides a conductive current path between the interface gateway device 112 and the housing 512 to electrically connect the interface gateway device 112 and the energy management system 502. An electrical connector 516, such as a plug or a receptacle, at a distal end of the cable 514 is configured to mechanically mate to an input/output port 518 disposed on the exterior housing 306 of the interface gateway device 112. The port 518 represents an electrical connector that complements the electrical connector 516 on the cable 514. The port 518 may be one of the ports 300, 302, 304 shown in FIG. 3. The electrical connector 516 removably couples to the port 518 along a mating axis 520.

In one embodiment, the energy management system 502 may be communicatively disconnected or uncoupled from the vehicle data communication system 100 when the electrical connector 516 is not mated to the port 518 or any other port or connector in the system 100. When communicatively uncoupled, the energy management system 502 does not receive any data parameters and does not perform functions for the vehicle data communication system 100, such as providing control services or generating trip plans, as described below.

The energy management system 502 may be portable and able to be used by a different communication system on a different vehicle, such as a different vehicle in the same consist as the vehicle 102 or a vehicle in a different vehicle system. The energy management system 502 is configured to establish a communicative connection with the vehicle data communication system on the different vehicle in order to receive information, such as data parameters, and provide control services. For example, the energy management system 502 may be communicatively coupled to the vehicle data communication system 100 during one or more trips of the vehicle 102, and the energy management system 502 may be moved to the different vehicle communication system for one or more subsequent trips of the different vehicle. The different vehicle data communication system may differ from the vehicle data communication system 100 with respect to the number, types, and arrangement of the devices (for example, interface gateway devices, data acquisition devices, controllers, components, subsystems, and/or client modules) that make up the systems, the communication configurations used to communicate in the systems, the functional capabilities of the systems, and the like. Although the vehicle data communication systems may vary, the energy management system 502 is configured to communicate with each of the communication systems.

In an embodiment, the energy management system 502 is configured to identify the vehicle data communication system 100 that the energy management system 502 is communicatively coupled to, retrieve a communication configuration based on the identified communication system 100, and communicate with the communication system 100 according to the communication configuration to receive data parameters and provide control services for the vehicle along a trip based on the received data parameters.

When the energy management system 502 is communicatively coupled to the vehicle data communication system 100, the energy management system 502 is configured to communicate directly or indirectly with some or all of the various parts of the system 100, such as the interface gateway device 112, the data acquisition modules 110, the controllers 108, the components 104 and/or subsystems 106, and/or the client modules 114. Via such communications, the energy management system 502 is able to receive data parameters and other information from various devices in the system 100. The energy management system 502 is also able to send or transmit information, such as control signals, to various devices in the system 100. In FIG. 5, the energy management system 502 is shown poised for making a direct electrical connection to the interface gateway device 112, through which the energy management system 502 communicates with the back end portion 116 and/or the front end portion 118 of the communication system 100. In an alternative embodiment, the energy management system 502 may couple directly to another device of the communication system 100, such as a controller 108 (or another control system on the vehicle 102), a data acquisition module 110, or a client module 114, instead of coupling directly to the interface gateway device 112. For example, the energy management system 502 may indirectly couple to the interface gateway device 112 via a client module 114 in direct electrical connection with the interface gateway device 112.

The energy management system 502 shown in FIG. 5 includes a processor 522 and a computer readable storage medium, or memory 524, that perform various functions described herein. The processor 522 and the memory 524 may be housed in the housing 512 when the energy management system 502 is a plug-in device. The processor 522 can include a microprocessor, controller, or equivalent control circuitry. The memory 524 can include a tangible and non-transitory computer readable storage medium, such as a physical device that stores data on a temporary or permanent basis for use by the processor 522. The memory 524 may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

In an alternative embodiment, instead of being a plug-in device, the energy management system 502 is a software application that is readable by and/or downloadable onto the vehicle data communication system 100, such as onto the interface gateway device 112, a controller 108, or another control system on the vehicle 102 (shown in FIG. 1). Thus, instead of including the processor 522 and the memory 524, the energy management system 502 may be installable, downloadable, or otherwise readable on a processor and/or a memory of the vehicle data communication system 100, such as the processor 200 and/or the memory 202 (both shown in FIG. 2) of the interface gateway device 112. The energy management system 502 may be stored as one or more files on a computer readable storage medium that is local to (for example, disposed on) the vehicle 102. The files may be computer-implemented instructions that direct a processor to perform various functions. The local storage medium may be a hard disc, flash drive, RAM, ROM, CD, DVD, or other type of memory, such as the memory 202. The energy management system 502 may be transmitted to the local storage medium from an external storage device, such as a CD, DVD, flash memory, external hard drive, a server, and the like. For example, the energy management system 502 may be downloaded on the local storage medium (such as the memory 202) from a remote server via a network connection, such as the Internet, a local access network connection, or the like. The files of the energy management system 502 may be transmitted via a wired communication link, such as a cable, a wireless communication link, such as via a wireless data network, or a combination wired and wireless communication pathway.

In another alternative embodiment, the energy management system 502 is a software application that remains contained on the external storage device instead of being transferred onto a local storage device in the vehicle data communication system 100. For example, the vehicle data communication system 100 may be communicatively coupled to the energy management system 502 when the external storage device (e.g., CD, DVD, flash device, external hard drive, etc.) is electrically connected to a local device, such as the interface gateway device 112 or another device with an appropriate input/output port, in the vehicle data communication system 100. Yet, although the energy management system 502 communicates with communication system 100 when the external storage device is connected, the files of the energy management system 502 are not copied or otherwise moved from the external storage device to the local device (e.g., the interface gateway device 112).

The energy management system 502 shown in FIG. 5 may include several modules that operate to cause the processor 522 to perform various functions described herein. The modules of the energy management system 502 include an identification module 526, a configuration module 528, a communication module 530, a plan generating module 532, and a trip monitoring module 534. In the alternative embodiments in which the energy management system 502 is a software application operable on a local device of the vehicle data communication system 100, the files of the energy management system 502 may direct a processor of the device (such as the processor 202 of the interface gateway device 112) to perform the same or similar functions as caused by the modules 526-534. Thus, the following description of the modules 526-534 may be applicable to both the embodiment of the energy management system 502 as the plug-in device shown in FIG. 5 and the embodiment of the energy management system 502 as a software application on an external storage device.

The identification module 526 determines information about the vehicle data communication system 100 to which the energy management system 502 is connected. For example, once the energy management system 502 recognizes the establishment of a communicative connection between the energy management system 502 and the vehicle data communication system 100, the identification module 526 may identify a type of the vehicle data communication system 100. The "type" of the vehicle data communication system 100 may include information about the various parts or devices that make up the communication system 100 and the vehicle 102 on which the communication system 100 is disposed. More specifically, the information about the vehicle data communication system 100 may include the number, arrangement, and kinds of the devices that make up the communication system 100. The information also may identify the specific manufacturer, model, and/or year of at least some of the devices. The information about the vehicle 102 may include the manufacturer, model, and/or year of the vehicle 102.

In one embodiment, the identification module 526 may identify the vehicle data communication system 100 communicatively coupled with the energy management system 502 by examining data communicated from the interface gateway device 112 to the energy management system 502 through the cable 514. For example, the vehicle data communication system 100 may transmit one or more identification messages that include identifying information to the energy management system 502. The identification messages may be transmitted to the energy management system 502 from the input/output port 518 of the interface gateway device 112 through the cable 514. The identification messages may include an address (e.g., IP address) or an alphanumeric bit string that is unique to the vehicle data communication system 100 (or a group or type of vehicle data communication systems that includes the communication system 100). For example, the identification messages communicated from the interface gateway device 112 may include header frames having identifying information specific to the vehicle data communication system 100 that transmits the messages.

The configuration module 528 of the energy management system 502 is configured to determine the communication configurations for the vehicle data communication system 100 communicatively coupled to the energy management system 502. The energy management system 502 uses the communication configurations to allow for communicating messages to and from the devices of the communication system 100. As described above, the communication configurations associated with the vehicle data communication system 100 may specify the rules and/or procedures for communicating messages between the energy management system 502 and the vehicle data communication system 100. The configuration module 528 may load the communication configurations for the vehicle data communication system 100 by conveying communication configuration settings to a communication module 530, described below.

The configuration module 528 may also be configured to determine functional capability configurations of the vehicle data communication system 100. The energy management system 502 uses the capability configurations to determine the command content of control messages sent to the communication system 100. The capability configurations associated with the vehicle data communication system 100 may specify the available control settings and formats for controlling one or more of the devices of the vehicle data communication system 100. For example, the capability configurations of the propulsion subsystem 504 may indicate available throttle settings of integers between "1" and "8," such that throttle setting "8" used more tractive effort than setting "1." When sending a control message to the propulsion subsystem 504, the energy management system 502 uses the configuration by issuing a control command for a throttle setting between (or including) the integers "1" and "8" in the content of the message, instead of, for example, throttle settings "9" or "6.5."

In another example, the capability configurations may indicate the control settings and formats for the specific user interface 510 in the vehicle data communication system 100. Some user interfaces have different capabilities than other user interfaces, such as the capability to display images, to display video, and to produce sounds. In addition, different user interfaces have different presentation settings and formats for presenting user output information and receiving user input information. For example, the user interface 510 may be configured with the capability to display a dynamic, time-variable display. The dynamic display may depict current and/or upcoming geographical elements, such as track elevation, for the segment of route being traversed and/or to be traversed by the vehicle 102. In another example, the display may show active route restrictions and/or rules, such as speed limits, for the current and/or upcoming segment of route during the trip. The capability configuration settings indicate the capability of the user interface 510 to receive and display dynamic information on the display and the available message formats for such information to be used by the user interface 510. Alternatively, the capability configuration may indicate that the user interface 510 only has the capability to display static images.

In one embodiment, once the identification module 526 identifies which vehicle data communication system 100 is coupled with the energy management system 502, the configuration module 528 obtains communication and/or capability configurations for the corresponding vehicle data communication system 100. The settings of the communication and/or capability configurations may be applicable to the vehicle data communication system 100 as a whole, or may be specific to individual devices or groups of devices in the vehicle data communication system 100. For example, different configuration settings may be obtained for the data acquisition modules 110 than the client modules 114 and/or the interface gateway device 112. Different configuration settings may also be obtained for different devices within the same group of devices. For example, the configuration module 528 may obtain different configuration settings for interfacing with a data acquisition module 110 that communicates with the user interface 510 than a different data acquisition module 110 that communicates with the propulsion subsystem 504 or the braking subsystem 506.

In an embodiment, the configuration module 528 may retrieve the settings for the communication and/or capability configurations from the memory 524 of the energy management system 502. Thus, the communication and/or capability configurations for the vehicle data communication system 100 may be stored in the memory 524. Since the energy management system 502 may be configured to communicatively couple to different vehicle data communication systems that include different devices, the memory 524 may be loaded with communication and/or capability configurations for multiple different vehicle data communication systems, including for the various different devices (e.g., data acquisition modules, components, subsystems, client modules, etc.) that make up the communication systems.

Optionally, if the communication and/or capability configurations for the identified vehicle data communication system 100 (or for one or more of the devices thereof) are not stored on the memory 524, the configuration module 528 may acquire the missing communication and/or capability configurations. The configuration module 528 may query an off-board device (e.g., a computer having a wireless transmitter or antenna) for the configurations. For example, energy management system 502 may include a communication system (not shown) that has both a transmitter and a receiver, or a transceiver. The communication system is used to wirelessly communicate with the off-board device. The off-board device may transmit the missing communication and/or capability configurations to the energy management system 502, where the configurations are stored in the memory 524.

Alternatively, or in addition, if the communication and/or capability configurations for the identified vehicle data communication system 100 are not stored on the memory 524, an on-board device may provide the missing configurations to the configuration module 528. The on-board device may be a computer device or other memory disposed on the vehicle 102 (shown in FIG. 1) or may be a device in the vehicle data communication system 100, such as the interface gateway device 112. Thus, in addition to communicating identification information, the vehicle data communication system 100 may be configured to communicate configuration information of the communication system 100 to the energy management system 502. For example, the vehicle data communication system 100 may be configured to only send such configuration information in response to a query from the energy management system 502 requesting the configuration information that the memory 524 of the energy management system 502 lacks.

The communication module 530 of the energy management system 502 receives the communication configuration for the vehicle data communication system 100 from the memory 524 or the configuration module 528 and uses the communication configuration to control the communication of messages to and/or from the communication system 100. As described above, the communication configurations may specify the parameters and settings used by the communication module 530 to receive data messages from the communication system 100 and to communicate control messages to the communication system 100. The communication module 218 may concurrently use different communication configurations with different devices, such as different data acquisition modules 110 and/or client modules 114, of the communication system 100. As described above, the contents of the control messages sent from the communication module 530 are generated using the capability configurations of the communication system 100, such that control commands in the control messages are able to be implemented by the appropriate devices in the communication system 100.

Optionally, the energy management system 502 includes a plan generating module 532 which used data parameters received from the vehicle data communication system 100 to generate a trip plan for the vehicle 102 (shown in FIG. 1). The plan generating module 532 processes the received data parameters to generate the trip plan. The trip plan may dictate one or more operations of the propulsion subsystem 504 and/or the braking subsystem 506 during a trip of the vehicle 102 in order to meet one or more goals, such as reducing fuel consumption, as described above. The dictated operations may be specific to different segments of the trip. For example, in a segment in which the vehicle 102 traverses a steep incline, the dictated operations according to the trip plan may direct the propulsion subsystem 504 to increase the tractive efforts as the vehicle 102 approaches and/or enters that incline segment. The trip plan may direct the propulsion subsystem 504 to increase the supplied tractive efforts by a larger amount if the vehicle 102 is carrying and/or propelling a significantly heavy cargo than would otherwise be increased if the data indicated a lighter cargo load. Thus, the dictated operations, according to the trip plan, may be used to control the propulsion subsystem 504 to change the tractive efforts of the propulsion subsystem 504 as the vehicle 102 travels over different segments of the trip.

The plan generating module 532 receives various data parameters relating the vehicle 102, the vehicle data communication system 100, the trip, and the like, to generate the trip plan. Once the trip plan is generated, the communication module 530 may communicate the entire trip plan, or control messages based on the trip plan, to the vehicle data communication system 100 for implementation by the communication system 100. Thus, bi-directional communications between the energy management system 502 and the vehicle data communication system 100 are used to form and implement the trip plan, as the control messages sent to the vehicle data communication system 100 from the energy management system 502 are based at least in part on information (e.g., data parameters) received by the energy management system 502 from the communication system 100.

The plan generating module 532 uses various information to generate the trip plan, including mission data, vehicle data, route data, and/or update thereto. Vehicle data includes information about the vehicle 102 (shown in FIG. 1), the vehicle consist, and/or cargo being propelled by the vehicle 102. For example, vehicle data may represent cargo content (such as information representative of cargo being transported by the vehicle 102) and/or vehicle information (such as model numbers, manufacturers, horsepower, and the like, of the vehicle 102). Mission data includes information about a current or upcoming trip by the vehicle 102. By way of example only, mission data may include schedule information (such as a departure time and an arrival time at the destination location), station information (such as the location of a beginning station where the upcoming trip is to begin and/or the location of an ending station where the trip ends), restriction information (such as work zone identifications, or information on locations where the route is being repaired or is near another route being repaired and corresponding speed/throttle limitations on the vehicle), and/or operating mode information (such as speed/throttle limitations on the vehicle 102 in various locations, slow orders, and the like). Route data includes information about the route or track upon which the vehicle 102 travels during the trip. For example, the route data may include information about locations of damaged sections of a route, locations of route sections that are under repair or construction, the curvature and/or grade of a route, GPS coordinates of the route, and the like.

Optionally, at least some mission data, vehicle data, and route data for a trip is communicated to the energy management system 502 from an on-board scheduler device (not shown). The on-board scheduler device may be a component 106, a subsystem 104, or a client module 114 of the vehicle data communication system 100. Alternatively, or in addition, at least some of the mission data, vehicle data, and route data for a trip are received by the energy management system 502 from an operator by inputting the data into the vehicle data communication system 100 using the user interface 510.

The plan generating module 532 may be configured to update the trip plan during a trip based on received data parameters that differ in value from the data parameters used to generate the trip plan. For example, the plan generating module 532 may generate a revised trip plan in response to, for example, updated route data that indicates that an upcoming segment of track is under repair or construction. The revised trip plan may re-route the vehicle 102 along a different segment of track. At least some of the data parameters received during the trip are sent from the vehicle data communication system 100, such as from the components 104, the subsystems 106, and/or the client modules 114, and analyzed by the trip monitoring module 534, described below.

In an alternative embodiment, the plan generating module 532 may select a previously generated trip plan from a number of such trip plans stored in the memory 524 of the energy management system 502 instead of generating an initial trip plan or instead of generating a revised trip plan during the trip. The plan generating module 532 may select the trip plan to retrieve from the memory 524 based on the data parameters received from the vehicle data communication system 100. In another example, the plan generating module 532 may receive one or more trip plans from an on-board or off-board device, such as via a wireless transmission of data, instead of generating the trip plan or retrieving the trip plan from the memory 524.

The trip monitoring module 534 of the energy management system 502 is configured to monitor the progress of the vehicle 102 (shown in FIG. 1) along the trip relative to the trip plan and generate control messages that are used to control the movements of the vehicle 102 such that the vehicle 102 moves according to the trip plan. For example, the trip monitoring module 534 may monitor the progress of the vehicle 102 along the trip by receiving data parameters from vehicle data communication system 100 in real-time as the vehicle 102 travels, and analyzing the received data with reference to the trip plan.

In an embodiment, the trip monitoring module 534 may receive data parameters from various devices in the vehicle data communication system 100, including the propulsion subsystem 504, the braking subsystem 506, the GPS receiver 508, the user interface 510, and other components 104 and/or subsystems 106. For example, the propulsion and the braking subsystems 504, 506 may communicate current tractive and braking settings, respectively, as well as current power usage, and power generated (e.g. during generative braking). The GPS receiver 508 sends current location information of the vehicle 102 to the energy management system 502 for tracking the location of the vehicle 102. Sensors, such as speedometers, accelerometers, fuel level sensors, brake pressure sensors, and the like, deliver respective data parameters (e.g., current speed, acceleration, remaining fuel amount, pressure of brake lines, etc.) to the energy management system 502. The user interface 510 may transmit operator input information to the energy management system 502, such as commands to increase or decrease tractive efforts, allowing the energy management system 502 to track the operator's actions to control the vehicle 102. Other examples of data parameters that may be transmitted to the trip monitoring module 534 include time, temperature, weather conditions, wear measurements, or the like.

The trip monitoring module 534 analyzes the received data parameters and compares the information to the trip plan to determine the content and recipients of control messages to generate for controlling the vehicle 102 according to the trip plan. For example, if the analysis reveals that the vehicle 102 is running at a speed slower than the trip plan instructs, then the trip monitoring module 534 determines to send a control message to the propulsion subsystem 504 to increase tractive efforts and/or to the braking subsystem 506 to decrease braking efforts, in order to increase the speed of the vehicle 102. Optionally, the content of the control messages may be used to control other functions of the vehicle 102 instead of the movement of the vehicle 102. The content may include control data for the purposes of sending signals to other subsystems 106, components 104, and/or client modules 114. For example, the control message may alert an operator of the vehicle 102 of a condition or fault by actuating an audible or visual alert/alarm. The control message may also be used to control devices on an exterior of the vehicle 102, such as a horn and/or lights. For example, as the trip monitoring module 534 of the energy management system 502 recognizes that the vehicle 102 is approaching a crossing, the energy management system 502 may generate a control message that is used to control the horn and lights to signal a warning to cars and other passersby that the vehicle 102 is approaching.

In one embodiment, the control messages from the trip monitoring module 534 are communicated directly to the propulsion subsystem 504 and/or the braking subsystem 506 to autonomously control the tractive efforts and braking efforts of the vehicle 102 during the trip according to the trip plan. The control messages may be transmitted in the communication configurations of the respective subsystems 504, 506 (or the controllers 108 that control the subsystems 504, 506). The content of the control messages may include control commands generated based on the capability configurations of the respective subsystems 504, 506. For example, as the vehicle 102 approaches a downhill segment of the route, the trip monitoring module 534 recognizes the approaching downhill segment and consults the trip plan, which may call for a reduction in traction efforts and an increase in braking efforts. The trip monitoring module 534 constructs or generates a control message to each of the propulsion and braking subsystems 504, 506 (or to the one or more controllers 108 thereof) that includes control commands, such as increase braking effort to notch setting 5, according to the proper capability configurations of the subsystems 504, 506. The control message may be communicated by the communication module 530 according to the appropriate communication configuration that allows the control message to be received by the intended recipient, such as the braking subsystem 506 or the controller 108 thereof.

In an alternative embodiment, the control messages from the trip monitoring module 534 are directed, at least initially, to the user interface device 510 in the vehicle 102 (shown in FIG. 1) for presentation to the operator of the vehicle 102, instead of directly to the components 104 or subsystems 106 that implement the control commands contained in the messages. Continuing the hypothetical example above, the trip monitoring module 534 may generate a control message to the user interface 510 to notify the operator that the braking effort should be increased along the upcoming downhill segment of the route (for the vehicle 102 to continue moving according to the trip plan). The operator, in response to receiving the notification, manually controls the braking subsystem 506 and/or the propulsion subsystem 504 to slow the vehicle 102 as suggested by the energy management system 502. Since the control message is communicated to the user interface 510 instead of directly to the propulsion and/or braking subsystems 504, 506, the content of the control message is formatted and presented according to the capability configurations of the user interface 510. For example, if the user interface 510 has the capability to display a dynamic map that shows a representation of the vehicle 102 relative to the changing geography and/or topography along the route, then the content of the control message may include graphical data to display on the user interface 510 as the dynamic map, showing the upcoming downhill segment of the route. If the user interface 510 has sound capability, then the control message may include audio data that is used by the user interface 510 to audibly alert the operator to upcoming changes in the tractive settings or braking settings due to the downhill segment. The control message to the user interface 510 is communicated by the communication module 530 using the communication configuration of the user interface 510.

As described above, the energy management system 502 in FIG. 5 is configured to generate a trip plan (for example, by the plan generating module 532) and to generate control messages to control the vehicle 102 along the trip according to the trip plan (for example, by the trip monitoring module 534). In other embodiments, however, an energy management system may be configured to generate a trip plan or to generate control messages, but not both. For example, an energy management system may generate the trip plan, then communicate the trip plan to an on-board control system in the vehicle data communication system 100 for the control system to implement by generating control messages. The control system may include or be a part of the interface gateway device 112, the controllers 108, or the like. In another example, an energy management system may not generate the trip plan, but may monitor the progress of the vehicle 102 during a trip and generate control messages to control the vehicle 102 during the trip according to a trip plan that was generated elsewhere.

Figure 6:
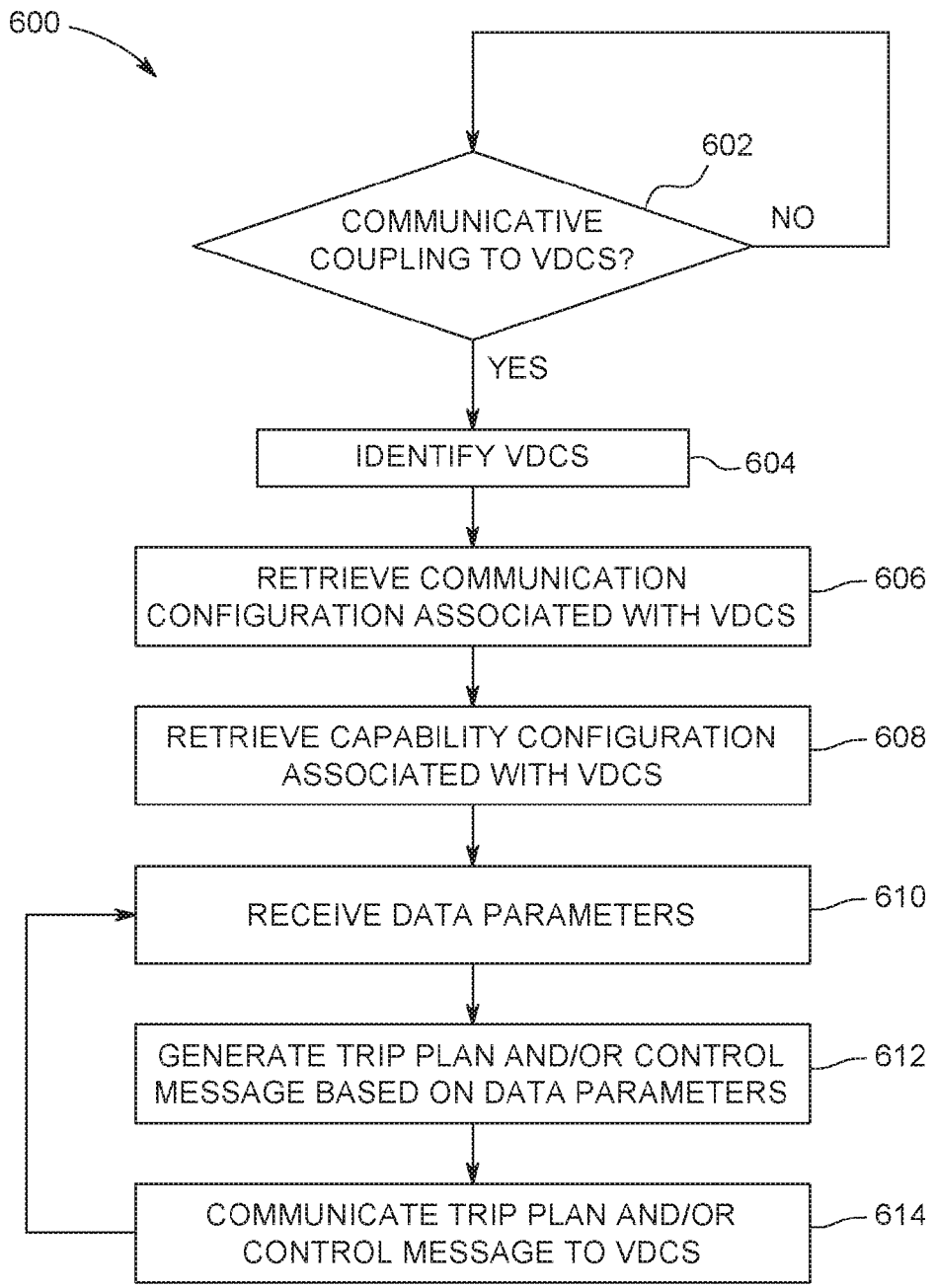
FIG. 6 is a flowchart of one embodiment of a method for controlling a vehicle during a trip along a route.

FIG. 6 is a flowchart of one embodiment of a method 600 for controlling a vehicle during a trip along a route. Optionally, the method 600 may be implemented by an energy management system, such as the energy management system 502 shown in FIG. 5. At 602, a determination is made whether or not a communicative coupling exists or is established with a vehicle data communication system. The vehicle data communication system may be, or may be similar to, the vehicle data communication system 100 shown in FIG. 1. The determination may be made based on whether or not communications are received from a vehicle data communication system, requesting the establishment of a communicative coupling. Optionally, the determination may be made upon establishing an electrical connection between an electrical connector of an energy management system and a mating electrical connector of the vehicle data communication system. For example, the energy management system may be a plug-in device, as described above with reference to FIG. 5. If no communicative coupling is established, flow of the method 600 returns to 602. For example, after a designated period of time, another determination of whether of communicative coupling is established may be made. If a communicative coupling is established, flow of the method 600 proceeds to 604.

At 604, the vehicle data communication system is identified. The identification may be a general identification of the entire system and/or a specific identification of the number, types, and/or arrangements of devices and/or components that make up the vehicle data communication system. At 606, a communication configuration associated with the identified vehicle data communication system is retrieved. The communication configuration may be retrieved from a memory of an energy management system. The communication configuration may designate a rules and/or procedures for communicating messages with the vehicle data communication system. For example, the vehicle data communication system includes one or more controllers that control operations of a propulsion subsystem and a braking subsystem of the vehicle. The communication configuration is used by the one or more controllers such that when a trip plan and/or control message according to the communication configuration is received by the controllers, the controllers are able to implement the tractive settings and braking settings contained in the trip plan and/or the control message using the respective propulsion and braking subsystems. At 608, a capability configuration associated with the identified vehicle data communication system is retrieved. The capability configuration may be retrieved from a memory of the energy management system or may be communicated to the energy management system from the vehicle data communication system or an off-board source. The capability configuration indicates available control settings and formats for the vehicle data communication system or the devices thereof.

At 610, data parameters are received from the vehicle data communication system. The data parameters are communicated according to the communication configuration associated with the vehicle data communication system. The data parameters may be received prior to and/or during the trip of the vehicle. The data parameters may include data collected by sensors, propulsion and braking subsystems, a GPS receiver, a user interface, a trip scheduler, and the like. At 612, a trip plan and/or a control message is generated based on the received data parameters. The trip plan and/or the control message dictate tractive and braking efforts of the vehicle during the trip, such as relative to a time or location of the vehicle along the route, in order to reduce fuel consumption, emissions, duration of trip, or attain other specified goals. For example, the trip plan may be generated prior to the vehicle starting to travel on the trip based on data parameters received prior to the trip. The control message may be generated during the vehicle traveling on the trip by comparing data parameters received during the trip to the trip plan that is generated prior to the trip. The trip plan and/or control message may also be generated according to the capability configuration of the vehicle data communication system in addition to the received data parameters. specify at least one of available control settings or formats of the vehicle data communication system; use the at least one capability configuration for generating a command in the control message that is able to be implemented by the vehicle data communication system At 614, the trip plan and/or the control message is communicated to the vehicle data communication system for the vehicle data communication system to implement the trip plan and/or the control message to control movement of the vehicle during the trip. The trip plan and/or the control message is communicated according to the communication configuration of the vehicle data communication system. After 614, flow of the method 600 may return to 610 to receive additional data parameters regarding the vehicle, the route, or the trip itself. The additional data parameters may be used to generate a revised trip plan and/or additional control messages that are communicated to the communication system. This sub-loop may continue until the communicative coupling with the vehicle data communication system is severed, and upon such occurrence the method 600 returns to 602.

In an embodiment, a system includes an energy management system that has one or more processors. The energy management system is configured to be communicatively coupled with a communication system of a vehicle that travels on a trip along a route. The energy management system is configured to receive data parameters related to at least one of the vehicle, the route, or the trip from the communication system. The energy management system is further configured to generate at least one of a trip plan or a control message for the vehicle based on the received data parameters. The at least one of the trip plan or the control message dictates tractive and braking efforts of the vehicle during the trip. The energy management system is configured to communicate the at least one of the trip plan or the control message to the communication system for the communication system to implement the at least one of the trip plan or the control message to control movement of the vehicle during the trip. The energy management system is configured to be removably coupled with the interface gateway device such that the energy management system is mechanically disengageable from the interface gateway device.

In an aspect, the energy management system is a plug-in device that includes a housing that holds the one or more processors therein.

In another aspect, the energy management system includes an electrical connector extending from the housing. The electrical connector is configured to removably mate to an electrical port of the communication system to electrically connect the energy management system to the communication system.

In another aspect, the energy management system is configured to communicatively couple directly to an interface gateway device of the communication system.

In another aspect, the energy management system generates the at least one of the trip plan or the control message to control movement of the vehicle during the trip in order to at least one of reduce fuel consumption, reduce travel time, reduce wear on the vehicle, reach a destination at a predefined time, increase throughput on a vehicle network, reduce emissions, or reduce noise.

In another aspect, the energy management system further includes a memory. The memory stores multiple communication configurations therein that specify at least one of rules or procedures for communicating messages with the communication system. The energy management system is configured to retrieve at least one of the communication configurations stored in the memory to use the at least one communication configuration for communicating with the communication system.

In another aspect, the energy management system further includes a memory. The memory stores multiple capability configurations therein that specify at least one of available control settings or formats of the communication system. The energy management system is configured to retrieve at least one of the capability configurations stored in the memory to use the at least one capability configuration for generating content of the control message that is able to be implemented by the communication system.

In another embodiment, a system includes an interface gateway device and an energy management system. The interface gateway device is on a communication system of a vehicle that travels on a trip along a route. The interface gateway device is configured to be communicatively coupled to a data acquisition module. The energy management system includes one or more processors. The energy management system is configured to be communicatively coupled to the interface gateway device. The energy management system is configured to be removably coupled with the communication system such that the energy management system is mechanically disengageable from the communication system. The interface gateway device is configured to receive data parameters related to at least one of the vehicle, the route, or the trip from the data acquisition module and to communicate the data parameters to the energy management system. The energy management system is configured to generate at least one of a trip plan or a control message for the vehicle based on the received data parameters and to communicate the at least one of the trip plan or the control message to the interface gateway device for the communication system to implement to control the vehicle during the trip.

In an aspect, the interface gateway device is configured to be communicatively coupled to a controller that controls at least one of a propulsion subsystem or a braking subsystem of the vehicle. The interface gateway device is further configured to communicate the at least one of the trip plan or the control message received from the energy management system to the controller for the controller to control the at least one of the propulsion subsystem or the braking subsystem according to the at least one of the trip plan or the control message.

In another aspect, the data acquisition module is configured to acquire the data parameters received by the interface gateway device from at least one of a propulsion subsystem of the vehicle, a braking subsystem of the vehicle, a GPS receiver, a user interface device, a speedometer, a scheduler device, or an accelerometer.

In another aspect, the energy management system is a plug-in device that includes a housing that holds the one or more processors therein. The energy management system is configured to removably electrically connect with the interface gateway device via an electrical connector.

In another aspect, the energy management system is configured to identify the interface gateway device and to implement a communication configuration associated with the interface gateway device when communicating the at least one of the trip plan or the control message to the interface gateway device. The communication configuration specifies at least one of rules or procedures for communicating messages with the interface gateway device.

In another aspect, the energy management system is configured to receive the data parameters and to generate the trip plan prior to the vehicle starting on the trip. The trip plan dictates tractive and braking efforts of the vehicle during the trip.

In another aspect, the energy management system is configured to receive the data parameters and to generate the control message during the trip of the vehicle. The energy management system generates the control message by comparing the received data parameters to the trip plan. The trip plan is generated prior to the vehicle starting on the trip. The control message dictates tractive and braking efforts of the vehicle based on at least one of time or location of the vehicle along the route such that the vehicle travels according to the trip plan.

In another aspect, the interface gateway device is further configured to be communicatively coupled to a user interface device that receives the control messages from the energy management system during the trip of the vehicle. The energy management system is configured to identify the user interface device and to implement a capability configuration associated with the user interface device when generating content of the control message. The capability configuration indicates available control settings and formats for presenting the content of the control message to an operator.

In another embodiment, a method for controlling a vehicle during a trip along a route includes determining whether a communicative coupling to a communication system on the vehicle is established. If the communicative coupling to the communication system is established, the method includes identifying the communication system. The method also includes retrieving a communication configuration associated with the communication system that is identified. The method further includes receiving data parameters from the communication system. The data parameters are communicated according to the communication configuration. The method includes generating at least one of a trip plan or a control message that dictates at least one of tractive efforts or braking efforts of the vehicle during the trip. The at least one of the trip plan or the control message is generated based on the received data parameters and the capability configuration. The method also includes communicating the at least one of the trip plan or the control message to the communication system for the communication system to implement the at least one of the trip plan or the control message to control movement of the vehicle during the trip. The at least one of the trip plan or the control message is communicated according to the communication configuration.

In an aspect, the method further includes retrieving a capability configuration associated with the communication system that is identified. The capability configuration indicates available control settings and formats for the communication system or devices thereof. The at least one of the trip plan or the control message is generated based on the capability configuration in addition to the received data parameters.

In another aspect, the generating step includes generating both the trip plan and the control message. The data parameters are received both before the vehicle starts traveling on the trip and during the vehicle traveling on the trip. The trip plan is generated based on data parameters received prior to the vehicle starting the trip. The control message is generated during the vehicle traveling on the trip. The control message is generated by comparing the data parameters received during the trip to the trip plan generated prior to the trip.

In another aspect, the communication system includes one or more controllers that control operations of a propulsion subsystem and a braking subsystem of the vehicle. The at least one of the trip plan or the control message dictates tractive settings for the propulsion subsystem and braking settings for the braking subsystem during the trip. The communication configuration specifies at least one of rules or procedures for communicating with the one or more controllers such that the one or more controllers implement the tractive settings and braking settings in response to receiving the at least one of the trip plan or the control message.

In another aspect, the method further includes plugging an electrical connector of an energy management system into a mating electrical connector of an interface gateway device of the communication system to communicatively couple the energy management system to the communication system such that the energy management system is mechanically disengageable from the communication system. The energy management system is configured to generate the at least one of the trip plan or the control message, i.e., in operation the energy management system performs the step(s) of generating the trip plan and/or the control message.

In another embodiment, a data communication system for a vehicle includes an interface gateway device that is configured to be communicatively coupled with a data acquisition module and a client module. The interface gateway device is further configured to receive a value of a data parameter related to operation of the vehicle from the data acquisition module and to communicate the value to the client module for performing a function for the vehicle. The interface gateway device also is configured to determine when either of the data acquisition module or the client module is communicatively coupled with the interface gateway device and to implement respective communication configurations associated with the data acquisition module or the client module to receive the value of the data parameter from the data acquisition module or communicate the value of the data parameter to the client module.

In another aspect, the interface gateway device is configured to communicate the value of the data parameter to the client module for the client module to use the value of the data parameter to control at least one of tractive effort or braking effort provided by the vehicle.

In another aspect, the interface gateway device is configured to determine when either of the data acquisition module or the client module is physically mated with one or more input/output ports of the interface gateway device.

In another aspect, the interface gateway device is configured to determine when either of the data acquisition module or the client module is communicatively coupled with the interface gateway device by a wireless communication link.

In another aspect, the interface gateway device is configured to determine an identity of either of the data acquisition module or the client module that is communicatively coupled with the interface gateway device.

In another aspect, the interface gateway device is configured to select at least one of a plurality of communication configurations from a computer readable storage medium for use in communicating with the data acquisition module or the client module based on the identity.

In another aspect, the communication configurations specify different communication protocols used to communicate with different data acquisition modules or different client modules.

In another embodiment, a data communication system for a vehicle is provided. The system includes an interface gateway device that is configured to be communicatively coupled with a data acquisition module and with a client module. The interface gateway device is further configured to receive a value of a data parameter related to operation of the vehicle from the data acquisition module and to communicate the value to the client module for performing a function for the vehicle. The interface gateway device also is configured, upon system initialization of the interface gateway device, to cycle through a plurality of communication protocols available to the interface gateway device, at each of a plurality of communication links of the interface gateway device, until the interface gateway device has determined that the data acquisition module and the client module are communicatively coupled with the interface gateway device and has identified first and second communication protocols of the plurality of communication protocols that enable the interface gateway device to communicate with the data acquisition module and the client module, respectively.

In another embodiment, a method for communicating data in a vehicle is provided. The method includes monitoring one or more input/output ports for a communication link with a device, determining an identity of the device that is communicatively coupled with the one or more input/output ports by the communication link, selecting a communication configuration associated with the device based on the identity of the device, and using the communication configuration to communicate with the device.

In another aspect, the device includes one or more of a data acquisition module or a client module, and the method further comprises one or more of the data acquisition module acquiring values of data parameters related to operations of the vehicle or the client module performing one or more functions for the vehicle based on the values of the data parameters.

In another aspect, the method further comprises the client module controlling at least one of tractive effort or braking effort of the vehicle based on the values of the data parameters.

In another aspect, the monitoring step includes determining when the device is physically mated with the one or more input/output ports.

In another aspect, the monitoring step includes determining when the device is communicatively coupled with the one or more input/output ports by a wireless communication link.

In another aspect, the selecting step includes selecting the communication configuration from a plurality of communication configurations stored on a computer readable storage medium based on the identity of the device.

In another aspect, the communication configurations specify different communication protocols used to communicate with different devices.

In another embodiment, a computer readable storage medium for a vehicle having a processor is provided. The computer readable storage medium includes one or more sets of instructions that direct the processor to monitor one or more input/output ports for a communication link with a device, determine an identity of the device that is communicatively coupled with the one or more input/output ports by the communication link, select a communication configuration associated with the device based on the identity of the device, and communicate with the device according to the communication configuration.

In another aspect, the computer readable storage medium is a tangible and non-transitory computer readable storage medium. For example, the computer readable storage medium may not be a transient electric or electromagnetic signal.

In another aspect, the one or more sets of instructions direct the processor to at least one of receive values of data parameters related to operations of the vehicle from a data acquisition module or communicate one or more of the values to a client module so that the client module performs one or more functions for the vehicle based on the values of the data parameters.

In another aspect, the one or more sets of instructions direct the processor to communicate values of data parameters related to operations of the vehicle to the client module so that the client module controls at least one of tractive effort or braking effort of the vehicle based on the values of the data parameters.

In another aspect, the one or more sets of instructions direct the processor to determine when the device is physically mated with the one or more input/output ports.

In another aspect, the one or more sets of instructions direct the processor to determine when the device is communicatively coupled with the processor by a wireless communication link.

In another aspect, the one or more sets of instructions direct the processor to select the communication configuration from a plurality of communication configurations stored on the computer readable storage medium based on the identity of the device.

In another aspect, the communication configurations specify different communication protocols used to communicate with different devices.

In another embodiment, a data communication system for a vehicle is provided. The system includes a data acquisition module, a client module, and an interface gateway module. The data acquisition module is configured to obtain a value of a data parameter related to operation of the vehicle. The client module is configured to use the value of the data parameter to perform a function for the vehicle. The interface gateway device is configured to be communicatively coupled with at least one of the data acquisition module or the client module by one or more communication links. The interface gateway device is further configured to communicate the value from the data acquisition module to the client module. The interface gateway device also is configured to determine when the at least one of the data acquisition module or the client module is communicatively coupled with the interface gateway device and to implement a communication configuration associated with the at least one of the data acquisition module or the client module to communicate the value of the data parameter to the at least one of the data acquisition module or the client module.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter described herein without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable a person of ordinary skill in the art to practice the embodiments of inventive subject matter, including making and using any devices or systems and performing any incorporated methods. The patentable scope of the inventive subject matter is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
an interface gateway device of a vehicle data communication system onboard a vehicle that is configured to travel along a route, the interface gateway device configured to be communicatively coupled to a data acquisition module, the interface gateway device including an electrical port configured to receive an electrical connector; and
an energy management system that includes one or more processors, the energy management system configured to be removably coupled with the interface gateway device such that the energy management system is mechanically disengageable from the interface gateway device;
wherein the interface gateway device is configured to receive a data parameter related to at least one of the vehicle, the route, or a trip of the vehicle from the data acquisition module and to communicate the data parameter to the energy management system;
wherein the energy management system is configured to communicate at least one of a trip plan or a control message to the interface gateway device, the at least one of the trip plan or the control message selected for communication based on the data parameter that is received by the interface gateway device, the at least one of the trip plan or the control message configured to be implemented by the vehicle to control movement of the vehicle along the route, wherein the at least one of the trip plan or the control message dictates one or more of a tractive effort or a braking effort of the vehicle based on at least one of time or location of the vehicle along the route for implementation by the vehicle along the route.

2. The system of claim 1, wherein the energy management system is a plug-in device that includes a housing in which the one or more processors are located.

3. The system of claim 2, wherein the energy management system includes the electrical connector extending from the housing, the electrical connector configured to mechanically mate to the electrical port of the interface gateway device to communicatively couple the energy management system with the interface gateway device, wherein the energy management system is mechanically disengageable from the interface gateway device by disconnecting the electrical connector from the electrical port.

4. The system of claim 1, wherein the energy management system is disposed in an external storage device, wherein the energy management system is communicatively coupled to the interface gateway device by connecting the external storage device to the electrical port of the interface gateway device.

5. The system of claim 1, wherein the interface gateway device is further configured to be communicatively coupled to a controller of the vehicle that controls one or more of a propulsion subsystem or a braking subsystem of the vehicle, the interface gateway device configured to communicate the control message that is communicated by the energy management system to the controller, the controller configured to control the propulsion subsystem and the braking subsystem according to the control message received from the interface gateway device.

6. The system of claim 1, wherein the energy management system includes a memory that is configured to store multiple trip plans, the energy management system configured to retrieve one of the trip plans from the memory to communicate to the interface gateway device based on the data parameter that is received.

7. The system of claim 1, wherein the energy management system is configured to communicate the trip plan to the interface gateway device, the energy management system configured to generate the trip plan during movement of the vehicle along the route based on the data parameter that is received.

8. The system of claim 1, wherein the energy management system is configured to identify the interface gateway device and to implement a communication configuration associated with the interface gateway device during communication of the at least one of the trip plan or the control message to the interface gateway device, the communication configuration specifying at least one of a rule or a procedure for communicating with the interface gateway device that is identified.

9. A system comprising: an energy management system that includes one or more processors, the energy management system configured to be removably coupled with a vehicle data communication system onboard a vehicle that is configured to travel along a route such that the energy management system is mechanically disengageable from the vehicle data communication system,
wherein the energy management system is configured to:
receive a data parameter related to at least one of the vehicle, the route, or a trip of the vehicle from the vehicle data communication system, and
communicate at least one of a trip plan or a control message to the vehicle data communication system, the at least one of the trip plan or the control message being selected for communication based on the data parameter that is received by the energy management system, the at least one of the trip plan or the control message configured to be implemented by the vehicle to control movement of the vehicle along the route, wherein the at least one of the trip plan or the control message dictates one or more of a tractive effort or a braking effort of the vehicle based on at least one of time or location of the vehicle along the route for implementation by the vehicle along the route.

10. The system of claim 9, wherein the energy management system is a plug-in device that includes a housing in which the one or more processors are located, the plug-in device including an electrical connector extending from the housing, the electrical connector configured to mechanically mate to an electrical port of the vehicle data communication system to communicatively couple the energy management system with the vehicle data communication system.

11. The system of claim 9, wherein the energy management system is disposed in an external storage device, wherein the energy management system is communicatively coupled to the vehicle data communication system by connecting the external storage device to an electrical port of the vehicle data communication system.

12. The system of claim 9, wherein the vehicle data communication system includes an interface gateway device that includes an electrical connector configured to receive an electrical connector of the energy management system to communicatively couple the interface gateway device to the energy management system, the interface gateway device configured to be communicatively coupled to a data acquisition module that acquires the data parameter that is communicated by the interface gateway device to the energy management system, the data acquisition module including at least one of one or more processors or one or more sensors.

13. The system of claim 9, wherein the vehicle data communication system includes a data acquisition module configured to acquire the data parameter that is communicated to the energy management system, the data acquisition module including at least one of one or more processors or one or more sensors, the data acquisition module configured to acquire the data parameter from at least one of a propulsion subsystem of the vehicle, a braking subsystem of the vehicle, a GPS receiver, a user interface device, a speedometer, a scheduler device, or an accelerometer.

14. The system of claim 9, wherein the energy management system includes a memory configured to store multiple communication configurations therein, each communication configuration specifying at least one of a rule or a procedure for communicating with the vehicle data communication system, wherein the energy management system is configured to retrieve one of the communication configurations stored in the memory and use the communication configuration that is retrieved for communicating the at least one of the trip plan or the control message to the vehicle data communication system.

15. A method for controlling a vehicle during a trip along a route comprising:
determining whether a communicative coupling between a vehicle data communication system on the vehicle and an energy management system is established;
responsive to establishing the communicative coupling, identifying, by one or more processors, the vehicle data communication system;
retrieving a communication configuration associated with the vehicle data communication system that is identified from a memory;
receiving data parameters from the vehicle data communication system, the data parameters communicated according to the communication configuration; and
communicating, according to the communication configuration, at least one of a trip plan or a control message based on the trip plan to the vehicle data communication system for the vehicle to implement to control movement of the vehicle during the trip, the at least one of the trip plan or the control message selected for communication based on the data parameters received from the vehicle data communication system, wherein the at least one of the trip plan or the control message dictates tractive efforts and braking efforts for different locations along the route for the vehicle to implement during the trip.

16. The method of claim 15, further comprising retrieving a capability configuration associated with the vehicle data communication system that is identified, the capability configuration indicating available control settings and formats for the vehicle data communication system, the at least one of the trip plan or the control message being generated based on the capability configuration in addition to the received data parameters.

17. The method of claim 15, further comprising generating the control message during the trip based on the trip plan that is generated prior to the trip, the control message being generated by comparing the data parameters received during the trip to the trip plan.

18. The method of claim 15, wherein the vehicle data communication system includes one or more controllers that control operations of a propulsion subsystem and a braking subsystem of the vehicle, the at least one of the trip plan or the control message dictating tractive settings for the propulsion subsystem and braking settings for the braking subsystem during the trip, the communication configuration specifying at least one of rules or procedures for communicating with the one or more controllers such that the one or more controllers implement the tractive settings and braking settings in response to receiving the at least one of the trip plan or the control message.

19. The method of claim 15, further comprising plugging an electrical connector of the energy management system that is a removable plug-in device into a mating electrical connector of an interface gateway device of the vehicle data communication system to communicatively couple the energy management system to the vehicle data communication system such that the energy management system is mechanically disengageable from the vehicle data communication system, the energy management system communicating the at least one of the trip plan or the control message to the vehicle data communication system.

* * * * *